United States Patent
Hunt et al.

(10) Patent No.: US 9,634,951 B1
(45) Date of Patent: Apr. 25, 2017

(54) AUTONOMOUS AGENT MESSAGING

(71) Applicant: Tripwire, Inc., Portland, OR (US)

(72) Inventors: Gwendolyn Meredith Hunt, Portland, OR (US); Benjamin John Jansen, Tigard, OR (US); Eric Lee Delaney, Portland, OR (US)

(73) Assignee: Tripwire, Inc., Portland, OR (US)

( * ) Notice: Subject to any disclaimer, the term of this patent is extended or adjusted under 35 U.S.C. 154(b) by 199 days.

(21) Appl. No.: 14/303,431

(22) Filed: Jun. 12, 2014

(51) Int. Cl.
*G06F 15/16* (2006.01)
*H04L 12/863* (2013.01)

(52) U.S. Cl.
CPC .................. *H04L 47/50* (2013.01)

(58) Field of Classification Search
CPC  H04L 47/10; H04L 49/9005; G06F 17/30067
See application file for complete search history.

(56) References Cited

U.S. PATENT DOCUMENTS

| | | | |
|---|---|---|---|
| 6,785,821 B1 | 8/2004 | Teal | |
| 7,243,348 B2 | 7/2007 | Good et al. | |
| 7,246,156 B2 * | 7/2007 | Ginter | G06F 21/55 709/217 |
| 7,316,016 B2 | 1/2008 | DiFalco | |
| 7,360,099 B2 | 4/2008 | DiFalco et al. | |
| 7,587,754 B2 | 9/2009 | DiFalco et al. | |
| 7,620,715 B2 | 11/2009 | DiFalco et al. | |
| 7,765,460 B2 | 7/2010 | DiFalco et al. | |
| 7,822,724 B2 | 10/2010 | DiFalco et al. | |
| 8,079,081 B1 | 12/2011 | Lavrik et al. | |
| 8,140,635 B2 | 3/2012 | DiFalco | |
| 8,176,158 B2 | 5/2012 | DiFalco et al. | |
| 8,346,935 B2 | 1/2013 | Mayo et al. | |
| 2002/0196330 A1 | 12/2002 | Park et al. | |
| 2004/0024843 A1 | 2/2004 | Smith | |
| 2004/0075738 A1 | 4/2004 | Burke et al. | |
| 2004/0122962 A1 | 6/2004 | DiFalco et al. | |
| 2004/0151114 A1 | 8/2004 | Ruutu | |

(Continued)

OTHER PUBLICATIONS

ITU-T Recommendation X.667, "Information technology—Open Systems Interconnection—Procedures for the operation of OSI Registration Authorities: Generation and registration of Universally Unique Identifiers (UUIDs) and their use as ASN.1 object identifier components," (document marked Sep. 2004), 34 pages.

(Continued)

*Primary Examiner* — Cheikh Ndiaye
(74) *Attorney, Agent, or Firm* — Klarquist Sparkman, LLP

(57) ABSTRACT

Apparatus and methods are disclosed for generating, sending, and receiving messages in a networked environment using autonomous (or semi-autonomous) agents. In one example of the disclosed technology, a method of collecting data from an agent executing on a host computer connected to one or more agent data consumers via a network connection includes collecting host data, the collecting occurring whether or not the agent can currently send data via the network connection. When the agent cannot send data via the network connection, the agent spools at least a portion of the collected host data in a spooler. When the agent can send data via the computer network, the agent sends at least a portion of the spooled host data to at least one of the agent data consumers.

29 Claims, 12 Drawing Sheets

(56) References Cited

U.S. PATENT DOCUMENTS

| | | |
|---|---|---|
| 2006/0206883 A1 | 9/2006 | Sabbouh |
| 2006/0242277 A1 | 10/2006 | Torrence et al. |
| 2007/0005665 A1* | 1/2007 | Vaitzblit ............ G06Q 10/06 |
| 2007/0043786 A1 | 2/2007 | DiFalco et al. |
| 2007/0124255 A1 | 5/2007 | DiFalco et al. |
| 2007/0239862 A1 | 10/2007 | Bronez et al. |
| 2008/0016501 A1 | 1/2008 | Muhlestein et al. |
| 2008/0021912 A1 | 1/2008 | Seligman et al. |
| 2008/0168420 A1 | 7/2008 | Sabbouh |
| 2009/0193298 A1* | 7/2009 | Mukherjee ......... G06F 11/0718 714/38.1 |
| 2009/0228577 A1* | 9/2009 | Webb-Johnson ......... G06F 8/65 709/221 |
| 2010/0005107 A1 | 1/2010 | DiFalco |
| 2010/0043066 A1 | 2/2010 | Miliefsky |
| 2011/0066951 A1 | 3/2011 | Ward-Karet et al. |
| 2011/0099236 A1 | 4/2011 | Vuong et al. |
| 2011/0197094 A1 | 8/2011 | Wagner |
| 2011/0197189 A1 | 8/2011 | Wagner et al. |
| 2011/0197205 A1 | 8/2011 | Wagner et al. |
| 2011/0208841 A1 | 8/2011 | Robertson et al. |
| 2012/0005688 A1 | 1/2012 | Kesavan et al. |
| 2012/0023076 A1 | 1/2012 | Torrence et al. |
| 2012/0089568 A1* | 4/2012 | Manley ............ H04L 47/10 707/634 |
| 2012/0179805 A1 | 7/2012 | DiFalco |
| 2012/0210434 A1 | 8/2012 | Curtis et al. |
| 2014/0237145 A1* | 8/2014 | Mints ............ G06F 5/12 710/53 |

OTHER PUBLICATIONS

Office Action dated Nov. 3, 2016 in U.S. Appl. No. 14/818,169, 11 pages.

* cited by examiner

AUTONOMOUS AGENT MESSAGING

BACKGROUND

Existing compliance and security systems for enterprise environments employ the use of agents for monitoring system integrity and reporting changes to one or more centralized compliance servers. However, existing agents are limited in a number of ways. Known examples of compliance agents are implemented as a monolithic Java agent that must be connected to a server almost continuously. Further, existing agents do not allow for plugins, quarantine, prioritizing of messaging, or disconnected operation. Accordingly, there is ample opportunity for improvement in the implementation of agents for monitoring system integrity and reporting changes.

SUMMARY

Apparatus and methods are disclosed for generating, sending, and receiving messages in a networked environment using autonomous (or semi-autonomous) agents. Techniques disclosed herein for sending and receiving messages with agents include flow control mechanisms that allow for spooling of collected data by the agents to improve reliability in the event of network delay and outages. In some examples of the disclosed technology, agent capabilities can be readily expanded through the use of on-demand agent plugins for facilitating data collection and which further allow separation of message capabilities from particular plugin identification. In some examples of the disclosed technology, message and agent identifiers are applied to increase data reliability and to allow re-transmission of lost messages upon request.

The disclosed agent platforms are designed to address one or more challenges presented in enterprise deployments of agents by, for example: reducing agent footprint, improving scalability, dealing with erratic computer networks, providing semi-autonomous; operation, and/or providing a self-correcting framework.

In some examples of the disclosed technology, a method of collecting data from an agent executing on a host computer connected to one or more agent data consumers via a network connection includes collecting host data whether or not the agent can currently send data via the network connection. When the agent cannot send data via the network connection, the agent stores at least a portion of the collected host data in a spooler, and when the agent can send data via the network connection, the agent sends at least a portion of the spooled host data to at least one of the agent data consumers. In some examples, the method further includes one or more plugins executable on the host computer collecting the host data, the agent sending data to the plugins indicating lag of the spooler. The plugins adjust the rate of collecting host data based at least in part on the indicated spooler lag.

In some examples of the disclosed technology, a method for recovering messages transmitted using a computer network includes sending one or more data messages from an agent to a server with the computer network, the data messages including sequence numbers generated by the agent, receiving a resend message from the server indicating one or more of the data messages are to be resent, the messages to be resent being indicated by one or more of the generated sequence numbers. Based on receiving the resend message, the agent searches for the indicated messages based on the generated sequence numbers, finds at least one of the messages within a range of messages indicated by the resend message that are stored on the computer hosting the agent, and resends the found messages to the server.

In some examples of the disclosed technology, a method of identifying agent messages sent on a computer network includes, by an agent executing on a first physical and/or virtual host computer, self-generating a unique identifier for the agent. The unique identifier is based at least in part on using a random or pseudorandom number generator. The method further includes sending messages from the agent to an agent data consumer, the messages including the unique identifier. In some examples, the agent is moved to a second physical and/or virtual host computer different than the first computer. After the agent is moved, the agent sends messages using the same unique identifier. In some examples, the agent is replicated on a second physical and/or virtual host computer different than the first computer. The replicated agent self-generates a second, different, unique identifier, and sends messages to the agent data consumer including the second unique identifier.

In some examples of the disclosed technology, a networked computing system includes one or more agent data consumers, one or more agent platform servers, each of the agent platform servers including an agent bridge, one or more agents, the agents being configured to execute on computing hosts, each of the computing hosts including the computer-readable storage media storing computer-executable instructions that when executed by the computing hosts, cause the computing hosts to perform one or more of the exemplary methods disclosed herein.

This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures. Further, any trademarks used herein are the property of their respective owners.

DETAILED DESCRIPTION

I. General Considerations

Figure 1:
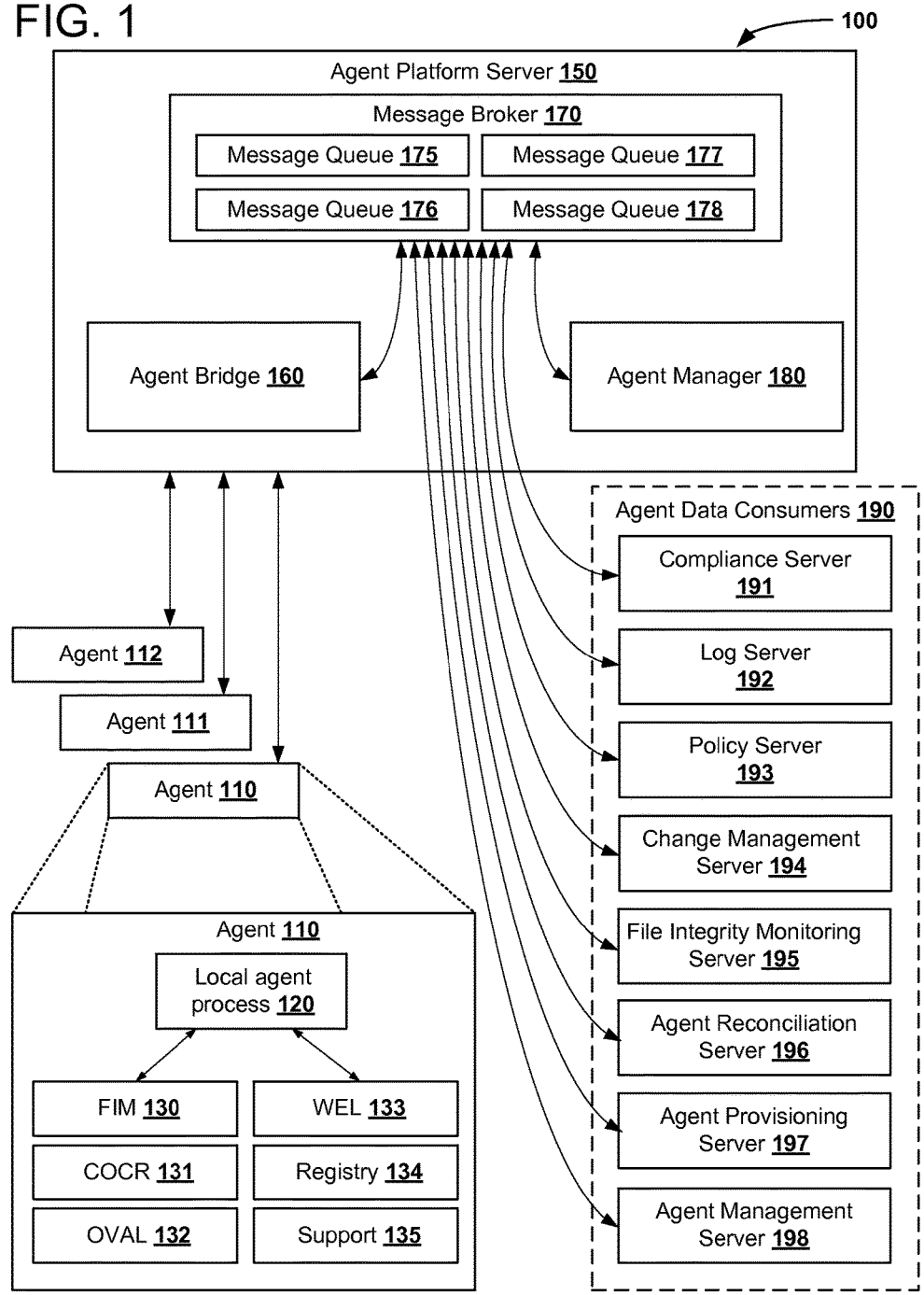
FIG. 1 illustrates an exemplary computing environment including an agent, a bridge, and a compliance server, as can be used in some embodiments of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "vulnerability," "weakness," "scan," and "perform" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as an agent executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Exemplary Computing Network Environment

FIG. 1 illustrates an exemplary computing environment 100 in which some examples of the disclosed technology can be implemented. A number of agents 110, 111, and 112 are illustrated in FIG. 1. One of the agents 110 is further detailed as shown, and includes a local agent process 120 that can manage and communicate with a number of plugins 130-135 (e.g., a file integrity monitoring (FIM) plugin 130, a command output capture rule (COCR) plugin 131, an Open Vulnerability Assessment Language (OVAL) plugin 132, a Windows event log (WEL) plugin 133, a Registry plugin 134, and a support plugin 135) that are configured to extend the functionality of the agent. Further details and examples of agents are discussed further below. As will be readily understood to one of ordinary skill in the relevant art, the agent technology disclosed in this paragraph is not limited to the functionality of agents 130-135, but can be adapted to specific deployments by adding other plugins or removing the depicted plugins.

Each of the agents 110-112 communicates with the rest of the system depicted in the computing environment 100 via an agent platform server 150. As shown, the agent platform server 150 includes an agent bridge 160 for sending messages to and from agents (e.g., agents 110-112). The agent bridge 160 can send messages over a computer network to agents executing on other computers, using inter-process and/or inter-thread communication to agents executing on the same computer as the communication bridge, or by using other suitable communication means. The illustrated agent platform server 150 also includes a message broker 170 with multiple message queues 175-178 for temporarily storing messages received from and sent to, for example, the agent bridge 160, an agent manager 180, and agent data consumers 190. In some examples, the message broker 170 has a single message queue 175. The agent platform server 150 coordinates operation of the agents by sending and receiving messages using the message broker 170.

Some agent platform server implementations can contain more than one message broker 170 organized as a network of message brokers. Additionally, some implementations can include additional instances of the agent bridge 160 or the agent manager 180. Various combinations of message brokers, agent bridges, and agent managers can be used to support high-availability and redundant capabilities.

The exemplary computing environment 100 includes a number of agent data consumers 190, including, but not limited to, a compliance server 191, a log server 192, a policy server 193, a change management server 194, and a file integrity monitoring server 195, an agent reconciliation server 196, an agent provisioning server 197, and an agent management server 198. In some examples, different combinations of agent data consumers 190 can be deployed in the environment 100 according to the desired compliance and security applications to be performed. These combinations are not limited to a single machine. The agent bridge 160, message broker 170, agent manager 180, or any combination of the agent data consumers can execute on separate computers, or separate virtual machines on a single or multiple computers. For example, the compliance server 191 can host a Compliance and Configuration Control (CCC) tool used to detect, analyze, and report on change activity in an IT infrastructure. The CCC tool can assess or receive configurations of the one or more nodes at one or more locations and determine whether the nodes comply with internal and external policies (e.g., government, regulatory, or third-party standards, such as Sarbanes-Oxley, HIPAA, ISO 27001, NIST 800, NERC, PCI, PCI-DSS, Basel II, Bill 198, CIS, DISA, FDCC, FFIEC, GCSx, GLBA, GPG 13, IBTRM, or other IT infrastructure compliance standards). The CCC tool can identify and validate changes to ensure these configurations remain in known and trusted states.

In particular implementations, the CCC tool operates by capturing a baseline of server file systems, desktop file system, directory servers, databases, virtual systems, middleware applications, and/or network device configurations in a known good state. Ongoing integrity checks then compare the current states against these baselines to detect changes. The CCC tool collects information used to reconcile changes detected by the agents 110-112, ensuring they are authorized and intended changes. The CCC tool can crosscheck detected changes with defined IT compliance policies (e.g., using policy-based filtering), with documented change tickets in a change control management ("CCM") system, with a list of approved changes, with automatically generated lists created by patch management and software provisioning tools, and/or against other desired and approved changes. This allows the CCC tool to automatically recognize desired changes and expose undesired changes.

The CCC tool can also generate one or more reports concerning the monitored nodes showing a wide variety of information (e.g., compliance information, configuration information, usage information, etc.) The compliance-related reports generated by the CCC tool can, in some instances, comprise a score for a node that indicates the relative compliance status of the node as a numerical value in a range of possible values (e.g., a score of 1 to 100 or other such numeric or alphabetical range). The CCC tool can also apply a set of one or more tests to the nodes to evaluate the compliance status of one or more nodes. In such embodiments, the compliance-related reports generated by the CCC tool can include the number of devices that passed a particular test as well as the number of devices that failed the test. Further, the CCC tool can store detected change event data in an event log or transmit the event data as soon as it is detected or shortly after it is detected. Event logs typically comprise a list of activities and configuration changes at nodes of the IT network.

An exemplary CCC tool that is suitable for use with the disclosed technology is the Tripwire® Enterprise tool available from Tripwire, Inc. The examples described below are sometimes shown or discussed as being used in connection with the Tripwire Enterprise tool. This particular usage should not be construed as limiting, however, as the disclosed technology can be adapted by those skilled in the art to help monitor and manage IT nodes using other compliance and configuration control tools as well.

The compliance server 191 can also include a security information and event management (SIEM) tool that is used to centralize the storage and interpretation of events, logs, or compliance reports observed and generated in an IT management infrastructure. The event, log, and compliance report information is typically produced by other software running in the IT network. For example, CCC tools generate events that are typically kept in event logs or stored in compliance reports, as discussed above. The SIEM can be used to provide a consistent central interface that an IT administrator can use to more efficiently monitor and manage activity and configuration changes in an IT network. As needed, the IT administrator can access and use the CCC tool, which may provide deeper information than that provided by the SIEM. A SIEM tool can also integrate with external remediation, ticketing, and/or workflow tools to assist with the process of incident resolution. Furthermore, certain SIEMs include functionality for generating reports that help satisfy regulatory requirements (e.g., Sarbanes-Oxley, PCI-DSS, GLBA, or any other such requirement or standard such as any of those listed above). For these reasons, SIEM tools are becoming more widely adopted by IT administrators who desire to use a single, centralized interface for monitoring and managing their increasingly complex IT infrastructures.

Logging tools can operate similarly to SIEM tools. Accordingly, for any of the embodiments disclosed below, a logging tool may take the place of a SIEM tool. For ease of readability, however, reference will typically be made to just a SIEM tool. An exemplary tool for logging and SIEM that is suitable for use with the disclosed technology is the Tripwire® Log Center tool available from Tripwire, Inc.

III. Example Agent Implementation

Figure 2:
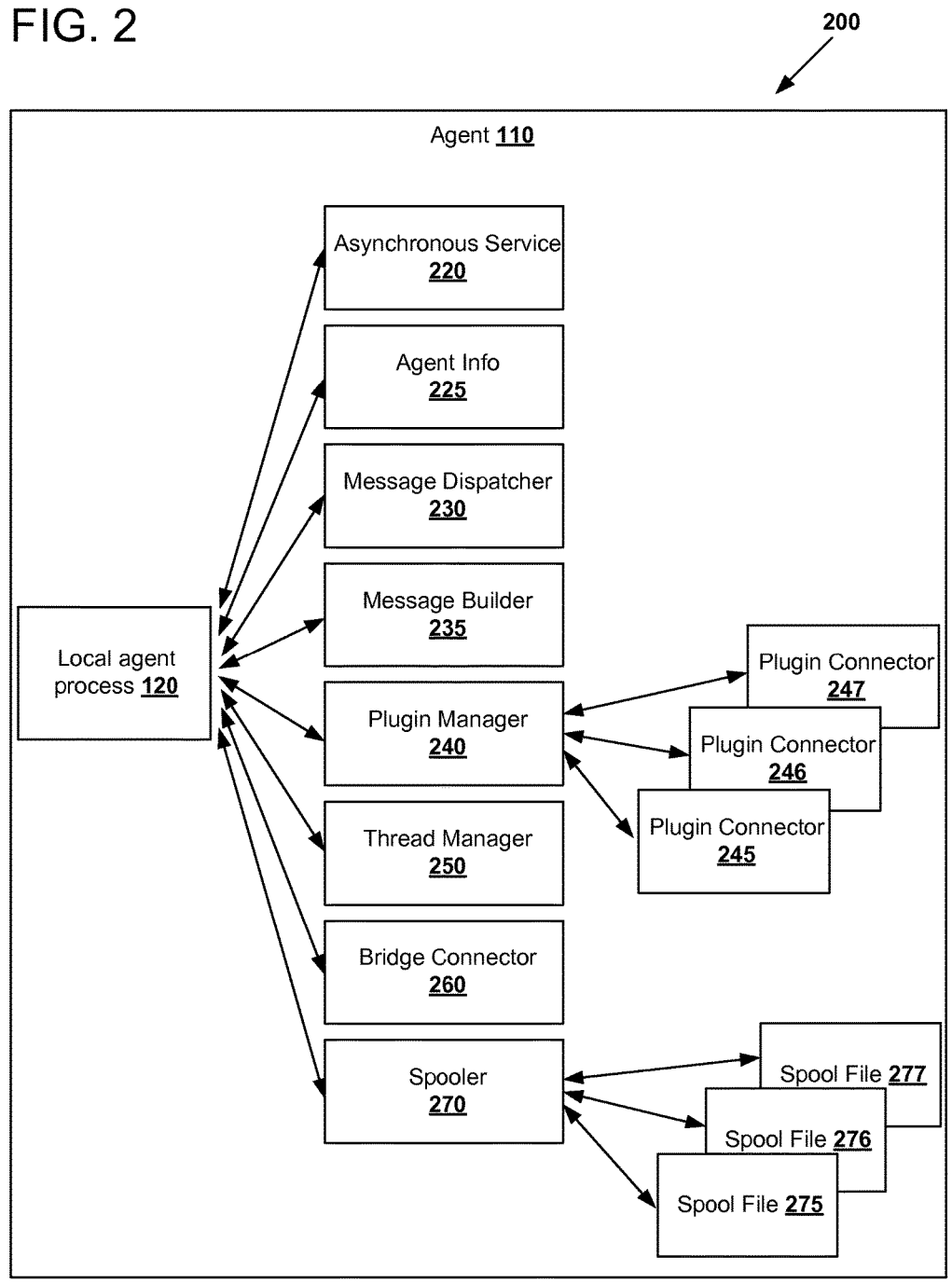
FIG. 2 is a block diagram illustrating an agent, as can be used in some embodiments of the disclosed technology.

FIG. 2 is a block diagram 200 further detailing the exemplary agent 110 introduced above regarding FIG. 1. As shown in FIG. 2, the agent 110 includes one or more local agent processes 120 that interact with a number of different components (e.g., components 220 through 270) to perform various agent functionalities. It should be readily understood to one of ordinary skill in the art that other examples of agents can include or omit some of the components illustrated in FIG. 2.

In some examples of the disclosed technology, the agent 110 provides a common platform for executing pluggable platform and/or native code in a manner that does not require a concurrently active connection to either the agent bridge 160 or agent data consumers 190. By allowing unconnected operation, the agent 110 is better able to tolerate intermittent network connections, delays, and/or errors in the agent platform server 150, agent data consumers 190, or interconnecting networks.

The agent 110 includes functionality for automatically adjusting the rate at which data on the host system is acquired based on, for example, currently-available host system resources including cache resources, host system workload, or other host system resources. In some examples, cached data can be resequenced based on priority changes and observed behavior of the host system. In some examples, the agent can automatically adjust and prioritize transmission of cached data to the agent bridge 160, based on, for example, the amount of time the agent has been connected to the network, a network reconnection event, and/or using a pseudorandom number to determine when to send cached data to the agent bridge. In some examples, the adjusted rate is based on the amount of lag between messages in a spool (e.g., spooler lag can be defined by an agent as the amount of time between the oldest and newest messages in a spool). In some examples, certain messages can be prioritized over others (e.g., messages carrying Security Content Automation Protocol (SCAP) data can be prioritized so that they are sent with higher priority than other types of messages).

In some examples of the disclosed technology, the agent 110 is implemented in a microkernel-based operating system platform, while in other examples, the agent is implemented using a more traditional monolithic kernel. The agent can include an embedded scheduler (e.g., executed by the local agent process 120 or another process) that determines when to execute agent tasks, even when the agent is not connected to a bridge or server.

In some examples, the agent 110 is a container-based agent that implements Federal Information Processing Standard (FIPS) cryptographic services for communicating and/or storing data. In some examples, information regarding FIPS containers, names, or other relevant FIPS fields are removed from data (e.g., before transmitting or storing FIPS data) to increase the difficulty of unauthorized decryption of FIPS communications and stored data.

In some examples, the agent 110 includes autonomous configuration capabilities. For example, the agent 110 can determine software versions and installed hardware associated with its host system or with installed plugins and based on the determined software and hardware, negotiate a more detailed configuration with any of the agent data consumers 190.

In some examples, the agent 110 includes support for on-demand push down of plugin modules. In some examples, the agent 110 includes the capability to automatically switch to different pre-designated endpoints by automatically switching to particular ports and/or bridges.

In some examples, the compliance server 191 communicates a desired spool depth to agents, which in turn adjust the rate at which data is sent to server. In some examples, when a spool associated with an agent becomes completely full, the agent can insert a mark in the spool and then, once space in the spool becomes available, peel off logs when data transmission resumes.

As shown in FIG. 2, the agent 110 includes an asynchronous service module 220 for controlling and coordinating asynchronous services, for example, processing of asynchronous messages received from and sent to the agent bridge. The asynchronous service module 220 can employ a number of asynchronous input/output (I/O) threads 255 for performing these tasks.

An agent information module 225 is used to send messages with information about the agent and its associated plugins, including identification information (e.g., one or more UUIDs), catalogs of available messages the agent is capable of consuming or producing, and other agent information.

A message dispatcher 230 sends messages between an agent bridge (e.g., via a bridge connector) and agent plugins. In some examples, the message dispatcher 230 can send commands to an agent spooler. A message builder 235 is used to build messages sent by the message dispatcher, including envelopes for such messages.

A plugin manager 240 including a number of plugin connectors 245-247 for connecting the agent to its plugins. A thread manager 250 is used to manage agent threads (e.g., bridge writer threads, plugin manager threads, asynchronous I/O threads, or other agent threads).

A bridge connector 260 is used to connect to one or more agent bridges and send messages from, for example, the message builder.

A multi-file spooler 270 includes multiple spool files 275-277 that can store data from the plugin manager before the data is sent to, for example, one or more of the agent bridges.

In some examples of the disclosed technology, agents are designed to provide multi-platform functionality, thus allowing developers to develop agents for, e.g., both Windows and Posix platforms concurrently.

In some examples, agents and their corresponding plugins are written in C++ using multi-platform libraries and coding methodologies. In some examples, using languages such as C++ allows for a smaller agent memory footprint than agents implemented using other languages, e.g., Java.

In some examples, one or more agents (e.g., agents 110-112), agent bridges (e.g., agent bridge 160), and/or agent data consumers 190 (e.g., compliance server 191) can be co-located on the same computer system. In other examples, each of the agents, agent bridges, and compliance servers are installed on separate computing systems that are connected using a network or other communication means, or are installed within separate virtual machines connected on a single computing system.

In some examples of the disclosed technology, the agent is executed as a non-root/non-administrator user. This provides additional security by restricting access, but in some deployments, it may be desirable to allow limited administrator access to the agent and/or a subset of agent plugins to, for example, allow access to administrator resources (e.g., to access the Windows Event Log (WEL)).

The agents can communicate to the bridge using, for example, a proxy provided that supports the SOCKS5 protocol, although other protocols can be employed. In some examples, it is desirable to utilize authentication features provided by the network protocol to limit access to, for example, the bridge and/or compliance server to authenticated agents. In some examples, the SOCKS5 proxy used can be previously installed by a system administrator, and be used to support other communications unrelated to agent traffic. One desirable aspect of not including a proxy server within an agent is that the attack surface of the agent is reduced, as there is no open SOCKS5 port for attackers to attempt to attack.

In some examples, the spooler 270 is supplemented by a parallel Last-In First-Out buffer (LIFO) for certain types of messages. For example, because consumers of SCAP information often prioritize the most recent data available over older data, the agent can use a LIFO as a second spool for data coming from, e.g., an OVAL plugin, such that the newest messages are transmitted to the server first.

Figure 3:
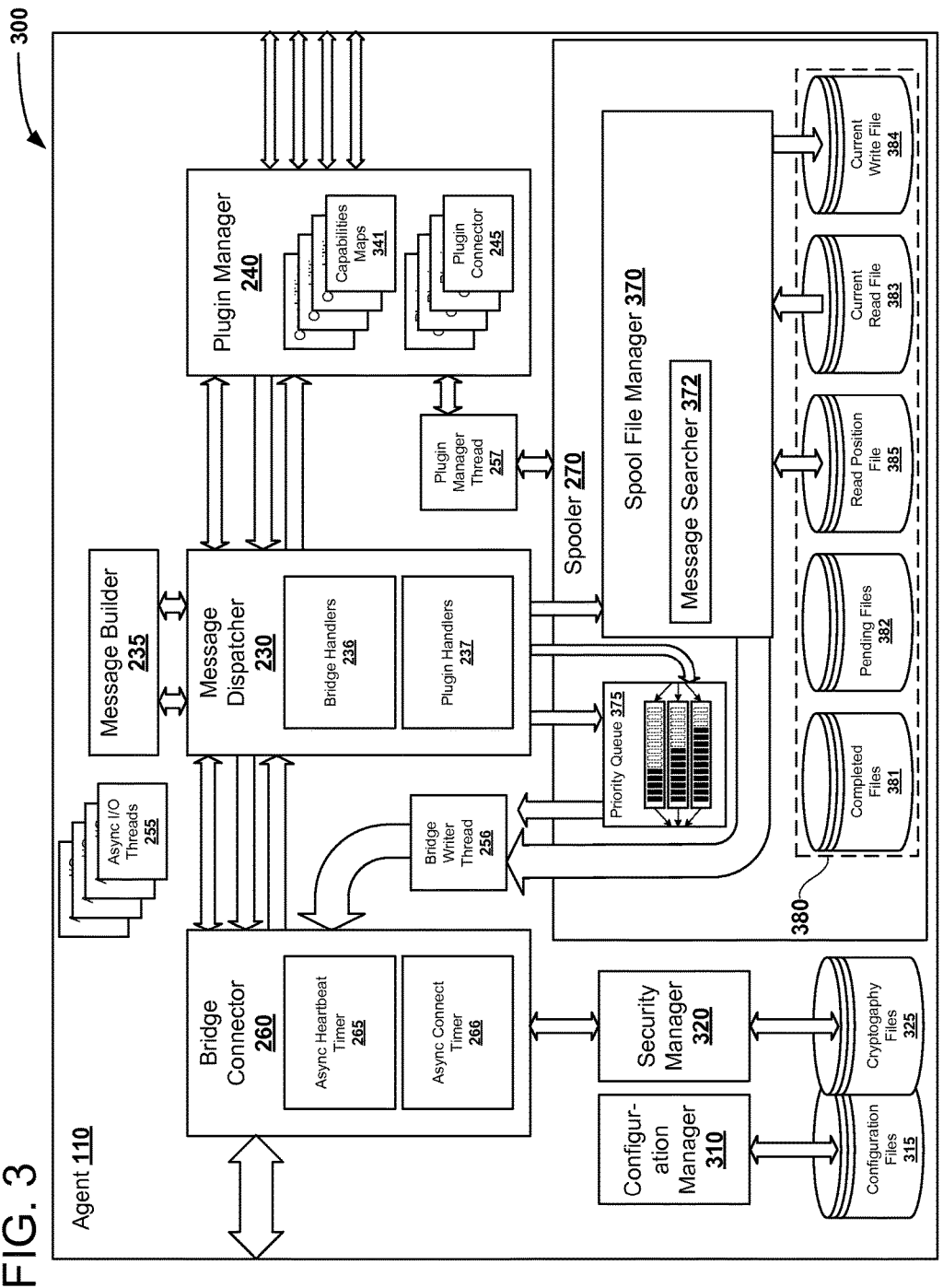
FIG. 3 is a block diagram further illustrating an agent, as can be used in some embodiments of the disclosed technology.

FIG. 3 is a block diagram 300 that further illustrates variations and details regarding the architecture of the exemplary agent 110 discussed above regarding FIGS. 1 and 2.

A. Agent Identification

In some examples of the disclosed technology, agents can use a unique identifier (e.g., a UUID (Universally Unique Identifier)), to identify themselves. The agent self-generates its unique identifier. The unique identifier is used to identify messages arriving to the bridge, as well as allowing for the routing of messages from server-side components to the agent. The unique identifier is independent of any network addresses (e.g., IPv4 or IPv6 addresses or other network addresses). In some examples, the unique identifier is associated with a set of MAC addresses associated with network interfaces discovered on the agent's host system.

When one or more network addresses (e.g., an IP address) on a system change, the agent can make note of this fact, but this does not substantially change operation of the agent. The agent can send IP addresses and associated names to the server for informational purposes, but identification of the agent by the server is primarily, if not exclusively, based on the unique identifier. An agent's identifier is not changed when the IP addresses of the agent's host system changes.

B. Local Agent Process

Each agent is controlled by a local agent process (e.g., local agent process 120). The local agent process can control, for example, the bridge connector 260, message dispatcher 230, plugin manager 240, and spooler 270 shown in FIG. 3.

The message dispatcher 230 controls communication flow between the plugin manager 240, the bridge connector 260, and the spooler 270. The message dispatcher 230 communicates with a message builder 235 for forming the message, and can include a number of bridge handlers 236 and plugin handlers 237 that are configured to operate with particular bridges and plugins, respectively.

The bridge connector 260 is used to connect to and send messages to and from the agent bridge 160. As shown in FIG. 3, the bridge connector 260 includes an asynchronous heartbeat timer 265, and an asynchronous connection timer 266. The asynchronous heartbeat timer 265 is used to determine intervals between sending "heartbeat" messages to the agent bridge 160, as will be further detailed below. The asynchronous connection timer 266 is used to reset a connection attempt to the bridge if the connection is not achieved by the end of a specified timeout period.

Also shown is an agent configuration manager 310, which is responsible for reading configuration data (e.g., configuration data stored in one or more configuration files 315) to determine how to configure the agent. Parameters that can be configured with the configuration data include, but are not limited to, timer and heartbeat time intervals, spooler configuration, plugin configuration, and security and encryption parameters. In some examples, the agent configuration manager 310 is responsible for searching for and invoking plugins by sending commands of enabled and/or disabled plugins to the plugin manager 240.

C. Agent Message Catalog

The agent 110 can also be configured to publish a catalog of messages that it consumes and produces. The agent 110 does not need to publish the plugins that are consuming and/or producing information. In this way, the actual plugins being used is not shown to the consumers. If a plugin becomes disabled, then the messages associated with that plugin are removed from the catalog. If a plugin is configured for load on-demand then messages associated with that plugin will be left in the catalog when the plugin is not running. The agent message catalog can be communicated using the agent heartbeat as a list of capabilities.

Also shown is a security manager 320, which is responsible for configuring security and encryption of messages send to/from the agent 110, as well as storage and management of encrypted data. The security manager 320 stores related data (e.g., security configuration data and encryption keys) in one or more cryptography files 325.

Because the data to be sent is stored in the spool file, the agent manager 180 can send data while a plugin is disabled (or enabled).

The agent can be configured dynamically using, e.g., Domain Name System (DNS) Service records (SRV records) or a configuration file. In some examples, using DNS SRV records for configuration is preferred when data for a particular DNS domain is sent to a single compliance server. The configuration file setup technique may be preferred when different machines in the same domain will connect to different compliance servers.

In some examples, a provisioning service can be used that informs agents about their initial configuration information, configures the agents with specific combinations of plugins, or provides an upgrade of agent or plugin executable code.

In some examples, a reconciliation service can be used to match previous agent identifiers and operating system information with current identifiers and current operating system information. This reconciliation service insures continuity in data and logging information stored in the agent data consumers 190.

Agents can be installed on individual target machines using, e.g., the host operating systems native packaging tools. For example, Windows targets can install agents using the Microsoft MSI installer, while Linux targets can use Red Hat Package Manager (RPM).

Using native system tools allows for easy deployment and upgrade of agents using mechanisms such as Active Directory. The core agent component and associated plugins can each be versioned independently.

On startup the agent collects data including: a list of IP addresses assigned to the host, domain names associated with the list of IP addresses, and performs a lookup for associated DNS SRV records.

D. Agent Plugins

The functionality of agents (e.g., agents 110-112) can be expanded with the use of agent plugins. For example, FIG. 2 illustrates a number of plugins that are connected to the local agent process through the use of a plugin manager. Plugins can be written in any suitable computer language (e.g., C++) using multi-platform libraries and coding methodologies, which allows for the sharing of the vast majority of agent code across different host platforms. In some examples, other languages besides C++ can be used to implement plugins, provided that support is available for the messaging layer used to connect the agent to its agent bridge. In some examples, Google Protobuf is used as the messaging layer.

As shown in FIG. 3, the agent 110 includes a plugin manager 240 that controls execution of plugins, and routes messages between plugins (e.g., via plugin connectors 245-247), the message dispatcher 230, and the spooler 270. The plugin manager also includes a number of capability maps (e.g., capability map 341) that list the types of messages and services that are produced and consumed by the connected plugins. The plugin maps can be used to build catalog entries, thereby advertising services available from the agent without exposing additional details regarding the plugins, using, e.g., ConfigRequest messages.

The loading of plugins can be controlled using a rule set, which specifies which plugins to load and connect to the agent, and the order in which to load plugins. In some examples, some plugins can be chained together, thereby providing a degree of modularization.

The plugin manager thread 257 is used to send data to the plugins indicating the current lag of the spooler (or "delta") to the plugin manager 240 for communication to individual plugins via the plugin connector 245. Each plugin can have a contract (e.g., an automatically negotiated contract) with the spooler 270 to respond in a certain period of time, and then return to sleep.

In some examples, agents can load plugins on an on-demand basis. In some examples, the agent provides a quarantine functionality to limit resources and/or data that can be accessed by one or more installed plugins. In some examples, plugins can include hooks to allow the plugin to be used across multiple operating system platforms (e.g., by handling both Windows and POSIX hooks).

Plugin Startup

Plugin startup can be initiated based on a number of events, for example, when an agent (e.g., agent 110) is initialized or after a plugin dies. In some examples, an agent initializes a plugin by issuing a command including arguments sufficient to describe the desired plugin operation (e.g., by passing command line arguments to initialize a plugin process and specifying a path to a configuration file, a path to a log file, read pipe identifier, and/or a write pipe). In some examples, the agent 110 and its associated plugins (e.g., plugins 130-135) can communicate with each other using other interprocess communications mechanisms provided by the operating system including, but not limited to, shared memory, anonymous pipes, UNIX pipes, streams, or sockets. In some examples, some or all of the plugin startup is delegated to the plugin manager thread 257, which can also route communications between the plugin manager 240 and the spooler. The configuration file can include information describing messages that the plugin will receive and send as well as expected behaviors for interacting with the agent that initiated the plugin. Passing arguments at plugin initialization provides the plugin enough information to be fully functional once execution begins.

In some examples, messages sent between agents 110-112, the agent platform server 150, and/or the agent data consumers 190 is compressed. Further, plugins can compress data before transferring to its agent, and messages stored in spooler 270 can be compressed. Compressing transmitted messages and/or stored messages can reduce network load and/or reduce the spooler 270 storage capacity requirements. Huffman encoding, Lempel-Ziv encoding, or other suitable compression techniques can be used to compress the messages.

In some examples, executable code for one or more of the plugins can be located in a specified directory on the agent host computer and then discovered and loaded by automatically traversing the specified directory and/or sub-directories for the plugin executables.

In some examples, messages are passed between an agent and its plugins using message envelopes. Messages sent from a plugin can be numbered and addressed by the associated plugin process. The messages can be addressed using a four-part scheme:

sender_uuid: the agent identifier from a handshake request message_type: a string value that equates to a specific message type sequence_major_number: a sequence major number provided by the agent sequence_minor_number: a number that can start at an arbitrary value and be increased by the plugin for sending subsequent messages Together, the sender_uuid, message_type, sequence_major_number, and sequence_minor_number can be used to form envelope addresses. In some examples, a plugin can be added to the agent to handle envelope requirements. By using a major and a minor sequence number, creating file system updates for every message can be avoided, while still providing enough information such that messages can be uniquified in a message spool. This enables agents to find and perform message ResendRequest operations on the spooled messages. Upon invocation of a plugin the agent assigned a new sequence_major_number, thereby making all the messages that the plugin creates, and that the agent writes to the spool, unique even after restart of a plugin or its corresponding agent. An example of major and minor numbers used to address plugin messages are described in Table 1 below.

TABLE 1

| Message | Major Number | Minor Number |
| --- | --- | --- |
| TailConfigResponse | 5 | 1 |
| TailFileData | 5 | 1 . . . 101 |
| Plugin Restart | | |
| TailFileData | 6 | 1 . . . 99 |
| TailConfigResponse | 6 | 1 |
| TailFileData | 6 | 100 . . . |

In some examples of the disclosed technology, a number of different messages types from an agent can be received by its plugins, including handshake requests, status requests, and shutdown requests, as discussed further below.

Handshake Request and Handshake Response

Upon startup, a plugin receives a handshake sent from its corresponding agent. The handshake can include data such as the agent's corresponding identifier (e.g., UUID), a sequence major number, and a data directory identifier. Responsive to receiving the handshake from its agent, the plugin responds with a handshake response message. The handshake response message includes: a plugin identifier (e.g., the name of the plugin), a description of the plugin's capabilities, and a description messages that will be produced by the plugin. For example, the plugin capabilities list can include a list of message types that can be accepted by the plugin, and the list of plugin messages produced can configuration and data response message types.

Status Requests

Agents (e.g., agent 110) can periodically send status messages to one or more of their associated plugins. The plugin in turn responds with a StatusResponse message within a predetermined time period, to notify the agent that the plugin is operating correctly. The status request can include an indication of the number of seconds between the time (e.g., the wall clock time) of the last message written to the spool and the time of the last message read and sent to the bridge. This provides the plugin with an indication of the state of the agent. For example, if the agent has sent all the messages in its spool, then the message delta is relatively small and sending another small message from the plugin is not expected to burden the agent. Conversely, if the agent has not sent a message to the bridge for some time (e.g., because the agent is disconnected from its bridge, or the agent is behind in sending data to the bridge), then the plugin can choose to buffer more data, thereby creating a larger message before sending to the agent. Sending fewer messages of larger size, (in some examples, up to about 1 Megabyte), incurs less network transmission overhead than sending more messages of a smaller size.

In some examples, plugin StatusResponse messages include the plugin name and a description of its current configuration. This information is collected and stored by the agent manager 180 (e.g., by receiving StatusResponse messages from the plugin manager 240 via the agent's bridge connector 260). By collecting plugin name and configuration description, a compliance sever (e.g., agent data consumers 190) can determine whether a particular plugin has an incorrect or outdated configuration, and address the configuration (by, e.g., sending a new plugin configuration to the agent).

Shutdown

In some examples of the disclosed technology, plugins can be shut down as follows. A plugin's host agent sends a Shutdown message to the agent instructing it to shut down. The plugin persists its state (e.g., by storing state information in a computer-readable storage media coupled to the agent) and shuts down. A brief period of time after sending the Shutdown message, the agent closes pipes to/from the agent and sends the plugin's associated process a SIGTERM signal.

ConfigRequest

In some examples of the disclosed technology, the capabilities of plugins can be enhanced using a ConfigRequest to exploit the autonomous nature of agent operations described herein. In a ConfigRequest pattern, a plugin provides a ConfigRequest capability. The plugin responds to ConfigRequests by sending ConfigResponse messages in response, and when configured to do so, additional data with the ConfigResponse.

In some examples of the disclosed technology, a ConfigRequest message for a plugin includes a serial number and a description of a configuration. When a new ConfigRequest is received by a plugin, the plugin replaces its current configuration with the new configuration described in the ConfigRequest. Plugins can store their current configuration and runtime state so that the plugin can resume operation using the current configuration and runtime when the plugin is restarted.

ConfigResponse

The plugin responds with a ConfigResponse message, which tells the Server that a new serial_number configuration was received and processed. If the plugin cannot service the entirety of the ConfigRequest, it can include error information in the ConfigResponse. The requested configuration may have been partially applied or rejected completely, as defined by the plugin.

Data Messages

Once a configuration is accepted and applied, the plugin begins sending data messages to the agent data consumers 190 via the agent bridge 160.

Heartbeat Messages

The agent periodically sends heartbeat messages. The heartbeat messages can contain information including, but not limited to, current wall clock time, current spooler minor/major number, currently-available messages that can be sent to/from plugins for servicing, and/or messages that cannot currently be serviced by any plugin on the agent.

E. Agent Spooler

FIG. 3 further outlines the capabilities and structure of the agent spooler 270. The agent spooler 270 includes a number of subcomponents, including a spool file manager 370, which includes one or more spool files 380, a message searcher 372 for searching for data in the spool files, and a priority queue 375.

The spooler stores data as a number of relatively small (e.g., 32 Megabyte) files on disk to form a complete spool (e.g., a 1 Gigabyte spool file comprising 32 each of 32 Megabyte files). Storing spooled data in small files can be desirable, as it limits data loss in the inadvertent event of agent or plugin shutdown or corruption of the smaller 32-Megabyte spool file. Within a spool file, the data can be further segmented in a series of headers and data, where the header indicates a variable length of the data in the segment. As shown in FIG. 3, the spool files 380 are stored in a number of computer-readable storage media and categorized according to the state of the data in the individual files, for example, completed files 381, pending files 382, the current read file 383, and the current write file 384. Further, markers indicating, e.g., current read and write position of the spool files can be stored in a read position file 385. As will be readily understood to one of ordinary skill in the art, the spool files 380 are not limited to storage in, for example, a hard drive, but can also be stored in a solid state drive (SSD), non-volatile or volatile memory, a database, or other suitable storage means.

The spool file manager manages the various spool files 381-385 illustrated in FIG. 3. Completed files 381 are spool files that contain messages that have already been sent to the agent bridge 160. Pending files 382 are spool files that contain unread messages ready to be read and sent to the agent bridge 160. The current read file 383 is an open spool file that is being read by the bridge writer thread 256 and concurrently forwarded to the bridge connector 260. After each message is read, the offset of the previously read message and the spool file name is updated in the read position file 385. This offset and file name lags the last message read by one, thereby enabling recovery if the bridge connector 260 is disconnected from the agent bridge 160 while a message is in flight (being sent). When the connection is reestablished, the message that was in flight is sent again. The agent platform server 150 and the agent data consumers 190 are configured to tolerate duplicate messages. The current write file 384 is the spool file that is open for writing of messages received from the plugins via the message dispatcher 230. At times the current read file 385 and current write file 383 can be the same file. The spool files 381-385 illustrated in FIG. 3 are one suitable configuration for use with the spooler 270, but it will be readily understood by one of ordinary skill in the art that other suitable spool file configurations can be employed.

Messages in the spooler 270 can be identified using a unique session identifier (e.g., unique at least for a particular session of operation on a particular agent). In some examples, the unique session identifier includes a major and a minor number. The major number is a unique identifier for the plugin session. The minor number is unique for each message of that type within the corresponding major number run session.

In some examples of the disclosed technology, session identifiers are timestamp agnostic, in other words, the current time on the host computer is not relevant to the ordering of messages according to session identifiers. The session identifiers can be used for relative positioning and sequencing of the messages. In some examples, the spooler 270 can be configured to overwrite a selected portion of the spool (e.g., 20% of the spool). In some examples, there is one spool file per plugin, while in other examples, two or more plugins share the same spool file.

In some examples, message data are encrypted. In some examples, the integrity and authenticity of messages can be verified using HMAC (Hash-based Message Authentication Codes) or other suitable methods to prevent tampering of messages sent by the agent or plugins.

The spooler 270 supports disconnected operations. The supported disconnected operations include disconnected plugins (e.g., ability to use the spool when plugins are disabled) and network disconnections (e.g., intentional or unintentional loss of network connectivity to the agent bridge). By spooling data the agent and its plugins can operate semi-autonomously. Plugins can receive data, configuration information, and perform operations (e.g. vulnerability scans, monitor watch logs, or other operations) on a regular basis, but the data can be returned regardless of the plugin being enabled/disabled. When the agent 110 reconnects with the bridge 160, it can send all or a portion of its spooled data one or more of the agent data consumers 190 via the agent bridge 160.

In some examples, the sizes of the spool file(s) are determined based at least in part on the rate at which messages are being sent. For example, if 0 to 5 messages are being sent, a 100 MB spool file may be sufficient, while 11 or more messages may consume a 1 GB or even larger spool file.

Data stored in the spool files can be secured using, e.g., obfuscation by compression, or encryption. In some examples, spool file data is not encrypted, but data in messages sent from the agent to the bridge is encrypted using, e.g., transport layer security (TLS) encryption. The agent should have at least some read access to the spooler data in order to determine, e.g., spool information such as message type, sequence major/minor numbers, and time stamps.

Upon agent startup, the agent spooler 270 creates a new spool file, so that in the event the end of the previous spool file was corrupted, new data will be added to an uncorrupted file, thereby avoiding appending data to a corrupt spool file that may be unreadable.

The priority queue 375 can be used route some messages to the bridge faster, according to priorities assigned to the messages or plugins producing the messages. For example, for a plugin that processes SCAP data, the most recent messages are the most important and thus are desirable to send earlier than lower-priority data. In some examples, all the higher priority messages in the priority queue 375 are sent first, while in other examples, the sending of messages is load balanced so that at least some of the lower-priority messages are sent before the higher priority messages are sent.

In some instances there may be more than one instance of agent spooler 270. For example, spooler instances can be dedicated to individual plugins, or shared by related plugins.

IV. Example Agent Platform Server

As shown in FIG. 1, the agent platform server provides an agent bridge 160 that can receive messages from agents (e.g., agents 110-112), a message broker 170 (including one or more message queues 175-178), and an agent manager. The message broker 170 can be used to route messages between the agent bridge 160 and any of the agent data consumers 190. Agents (e.g., agents 110-112) can establish a network connection (e.g., to a number of agent data consumers 190, including the compliance server 191, the log server 192, the policy server 193, the change management server 194, etc.) to the agent bridge 160 that is hosted on an agent platform server. The agent connection to the agent bridge 160 can be encrypted using, e.g., Transport Layer Security, Secure Sockets Layer, or other suitable encryption scheme. In TCP/UDP examples, the default port used to connect to the bridge is port number 5670, but other suitable network ports can be employed. To provide additional security, the agent can be configured so that it does not listen for incoming connections from the bridge or compliance server. Instead, the agent initiates communication to these network targets.

Agents can use the underlying operating system routing information to determine how to connect to the agent bridge. Since agents create connections to the bridge, no return routing (from the bridge to an agent) is necessary. Once the connection is established, messages are sent in both directions. For example, an agent bridge can send advisory messages to its associated agents instructed the agents to hold message, or to hold particular types of messages, until a subsequent advisory message is sent indicated that the agent should resume sending of messages (or resume sending particular types of messages). The agents 110-112 and the agent bridge 160 can each establish agent identifiers (e.g., UUIDs) for uniquely identifying the agents and bridges, thereby avoiding reliance on other identifiers, such as IP addresses or MAC addresses that may not provide a unique identifier in virtual environments.

In some operational scenarios one or more agent data consumers 190 may be shutdown for maintenance or is temporarily off-line and undergoing a fault recovery operation. The agent bridge 160 monitors the message queues determining if the agent data consumers 190 are removing messages in a timely fashion. If the message removal is slowing or stopped the agent bridge 160 sends advisory messages to all agents informing them to stop or restart specific message types. This provides a level of fairness for all messages such that a non-operational agent data consumer does not block the traffic of messages to other operational agent data consumers. The message fairness delivery algorithm adds resiliency and robustness in the communication channel from the plugins through the agent and the spooler through the connection to the agent bridge to the message broker and to the agent data consumers. In some examples the agent 110 could have more than one spooler 270 dedicated to a particular plugin or message type facilitating message delivery fairness.

Messages (e.g., messages from any of the agent data consumers 190) are sent to and from agents via the agent bridge 160. The agent's bridge subscribes to a topic though which all agent-bound messages travel Messages can be transported within an envelope. The envelope includes source and/or destination information, and in some examples includes a time stamp, the associated agent identifiers (e.g., UUIDs), message type the sequence major and/or minor numbers, or other information that can be used to route and process the messages contained in the envelope.

In some examples, the agent platform server 150 is hosted on a separate server from any of the agents 110-112, while in other examples, the agent platform server 150 can reside on the same server as the agents 110-112 and/or the agent data consumers 190. In some examples, the agent platform server 150 resides in the same local area network (LAN) as the agents 110-112 and/or the agent data consumers, while in other examples, the agent platform server 150 resides at a separate location or in a computing cloud.

A. Agent Bridge

The agent bridge 160 receives and sends messages from and to agents (e.g., agents 110-112). The agent bridge 160 can notify other components when agent connections 110-112 are created or destroyed, using, e.g., AgentConnect and AgentDisconnect messages. The agent bridge 160 can generate a bridge identifier (e.g., a UUID) for itself that can be used by the agents 110-112 and the agent data consumers 190 to uniquely identify the agent bridge in subsequent messages.

AgentConnect/AgentDisconnect

When an agent connects to the bridge, the bridge creates an AgentConnect message. An agent manager (e.g., executing on one or more of the agent data consumers 190) subscribes to these messages. Similarly, when an agent disconnects from the bridge, the bridge creates an AgentDisconnect message. The agent manager 180 subscribes to these messages.

B. Agent Manager

In some examples of the disclosed technology, the computing environment 100 includes the agent manager 180, which can execute on, for example, the agent platform server, or another suitable environment. The agent manager can manage the status of agents and provide information for agent data consumers 190 upon request.

The agent manager 180 sends messages to configure agent plugins and processes data stream from agents. Some of the agent data that can be tracked by the agent manager include: heartbeats, host names, IPv4/IPv6 addresses, capabilities, capability configurations (capability and serial number), and host platform. In some examples, the configuration messages can be initiated by the agent 110 itself, or by one of the agent data consumers 190.

OnlineAgentsRequest/OnlineAgentsResponse

In some examples of the disclosed technology, the agent manager 180 can also provide OnlineAgentsRequest services. The agent manager 180 sends an OnlineAgentsRequest message to get a list of online Agents. This request is returned from listening agents in the form of an OnlineAgentsResponse message. The OnlineAgentsResponse message can be used in conjunction with the ongoing AgentOnline messages to track online agents. The agent manager 180 sends AgentOnline messages when, for example, an agent connects to the agent bridge or when an agent's capabilities change. For example, in the event that a plugin dies and its associated agent does not restart the plugin, the capabilities for that plugin will no longer be included in catalog published with the associated agents' heartbeat. Upon recognizing the change, the agent manager 180 can publish a new AgentOnline message for the agent. The allows the agent data consumers 190 to discover new plugins or determine that plugins are no longer operational, based on changes in the message catalog reported in the heartbeat messages.

C. Message Broker

The agent platform server 150 can use the message broker 170 for distributing messages between the agent bridge 160, the agent manager 180, and the agent data consumers 190. The message queues 175-178 allow messages to be temporarily stored before sending on to their destination, and can be used to buffer traffic in the event of a failure in the connecting network, one or more of the agents 110-112, or one or more of the agent data consumers 190.

V. Example Agent Data Consumers

FIG. 1 illustrates a number of agent data consumers 190, including a compliance server 191, a log server 192, a policy server 193, a change management server 194, a file integrity monitoring server 195, etc. Although a finite number of agent data consumers 190 are shown in FIG. 1, it will be readily understood to one of ordinary skill in the art that any number of servers can consume agent data, and that some of the agent data consumers 190 can be omitted, depending on the deployment environment.

VI. Example Techniques Performed in Exemplary Agent Systems

A. Disconnected Mode

The agents disclosed herein are designed to be semi-autonomous. For example, agent plugins are designed to accept a complete configuration describing what acts the agent is to perform and when. As a result, plugins can continue operating according to the current configuration without communicating with the agent manager 180 or the agent data consumers 190.

In other words, an agent and its plugins can continue their normal operations of watching a target machine even while being unable to communicate with the agent bridge 160, agent manager 180, and/or agent data consumers 190. Messages and data generated by the plugin can be spooled by the agent until a connection to the bridge can be re-established and the spooled messages sent.

B. Example Agent Configuration and Registration

Figure 4:
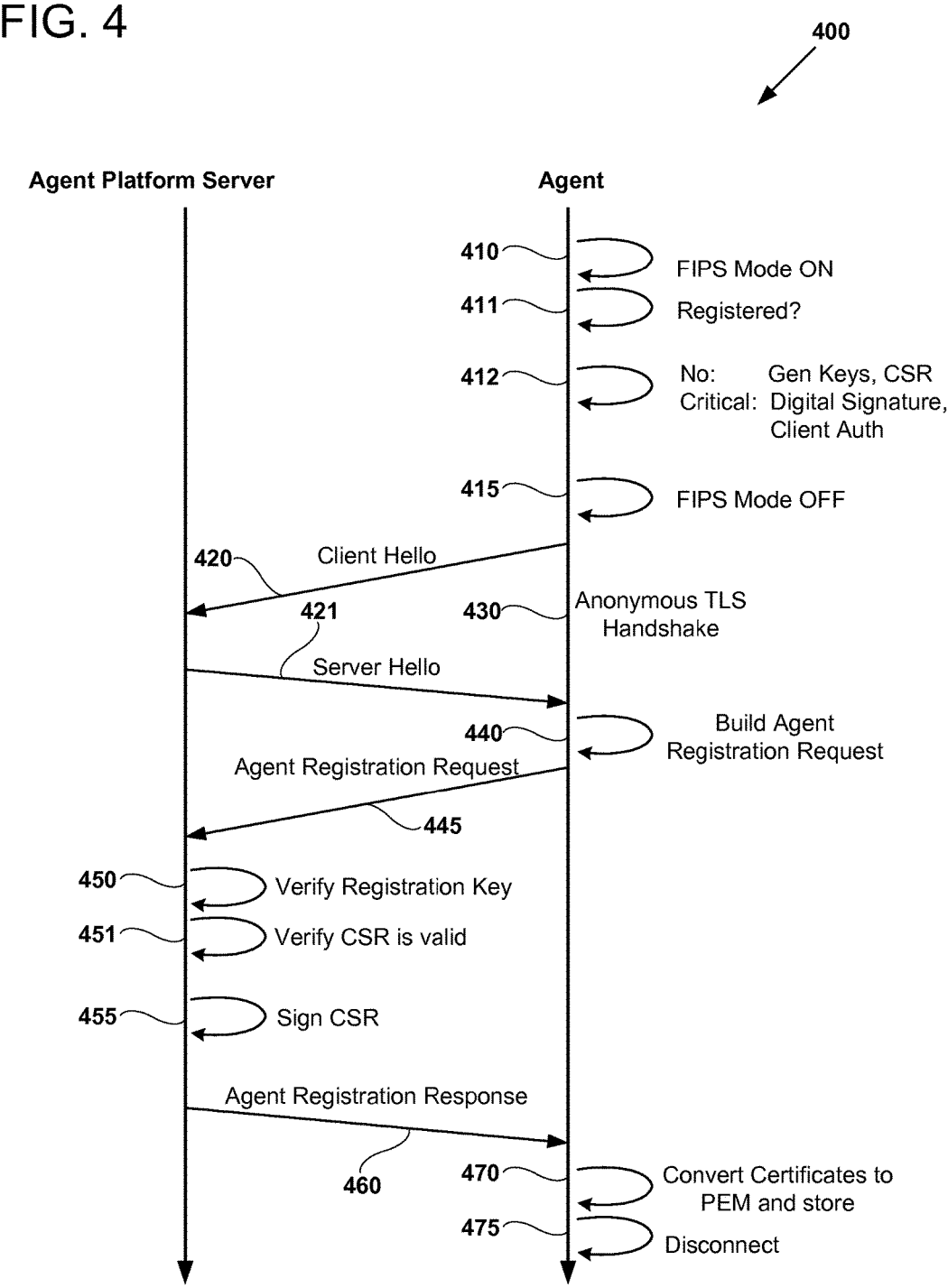
FIG. 4 is a diagram that outlines an example of communication between an agent and an agent platform server, as can be used in some embodiments of the disclosed technology.

FIG. 4 is a diagram 400 that outlines an example of communication between an agent and an agent platform server during agent registration, as can be used in some examples of the disclosed technology. The acts and messages are shown in a time scale. It will be readily understood that this is an example, and that some embodiments of the disclosed technology can add, omit, or rearrange the acts outlined in FIG. 4. In some examples, the agent is the agent 110 and the agent platform server 150, as described above, although other agent and agent platform server structures can be employed.

At act 410, the agent turns Federal Information Processing Standards (FIPS) mode on for use in subsequent communications. At act 411, the agent checks to determine whether it has already been registered. If the agent has not been registered, then the agent generates keys and a certificate signing request (CSR) at act 412. Further, at act 412 the agent generates a digital signature and client authorization information. At act 415, the agent turns FIPS mode off.

At act 420, the agent sends a client hello message to the agent platform server. In some examples of the disclosed technology, the agent initiates an anonymous Transport Layer Security (TLS) handshake request with the agent platform server that is further detailed below regarding FIG. 5. Responsive to receiving the client hello message, the agent platform server sends a server hello message to the agent at act 421. At act 440, the agent builds an agent registration request, and sends the request to the agent platform server at act 445. The agent registration request includes the keys, CSR, digital signature, and client authorization information that were previously generated.

When the agent platform server receives the agent registration request, the server verifies the request. At acts 450 and 451, the agent platform server verifies the registration key and CSR received with the agent registration request. At act 455, the agent platform server signs the CSR, and sends the signed CSR to the agent in an agent registration response message at act 460.

At act 470, the agent converts the signed CSR to a Privacy Enhanced Mail (PEM) format certificate and stores the PEM certificate in a local computer readable storage media. At act 475, the agent disconnects from the agent platform server.

AgentUUIDChange Message

In some examples of the disclosed technology, agents are uniquely identified by an agent UUID, which is 128 bits in length. Some examples of when an agent data consumer 190 can receive an AgentUUIDChange message from an agent include: registration of a new agent, corruption of agent state files, change in one or more MAC addresses on the system, cloning of a virtual machine (VM), and/or replacement of one or more network cards on the agent's host machine.

In the cases of a new agent registration or corruption of an agent state file, an AgentUUIDChange message arrives at the compliance server with a new current UUID and the previous UUID is not set because it did not exist or was unreadable.

In the case of MAC changes, VM changes, and NIC changes, the AgentUUIDChange message can arrive with both the new current and the previous UUID set. In this case, the server should be configured to take appropriate action, e.g., merging agent data if the messages are from the same system, or treating the data as separate in the case of a cloned system. The server needs to determine whether the assets associated with the agent are the same node or different nodes and whether to associate the previous data stream with the new data stream. In some examples, the server is configured to make these determinations automatically, while in other examples, the server receives input (e.g., from a user or a configuration file) to make the determination.

In the event that a virtual machine with the agent is installed is cloned, but not yet started, then the cloned agent will authenticated (e.g., using password and/or public-key certificates, as described above) and obtain new certificates for connecting to the bridge. The agent will then generate a new UUID as described above.

In the event that a virtual machine with the agent installed is cloned after agent startup, then upon startup, the new agent will connect to the bridge using the existing certificates stored on the cloned system. If all MAC addresses on the agent's host system have changed, the agent will generate a new UUID and send an AgentUUIDChange message with the new and previous UUIDs for the agent. The server will create a new asset record corresponding to the new agent's host system. If not all of the MAC addresses on the agent's host system are changed, then the will connect to the bridge using the certificate and existing UUID. This allows for the same agent identifier to be used in, for examples, maintenance scenarios where a network interface card is replaced in a host having more than one network interface card, without generating a new agent identifier.

C. Example Agent Certificate Handshake

Figure 5:
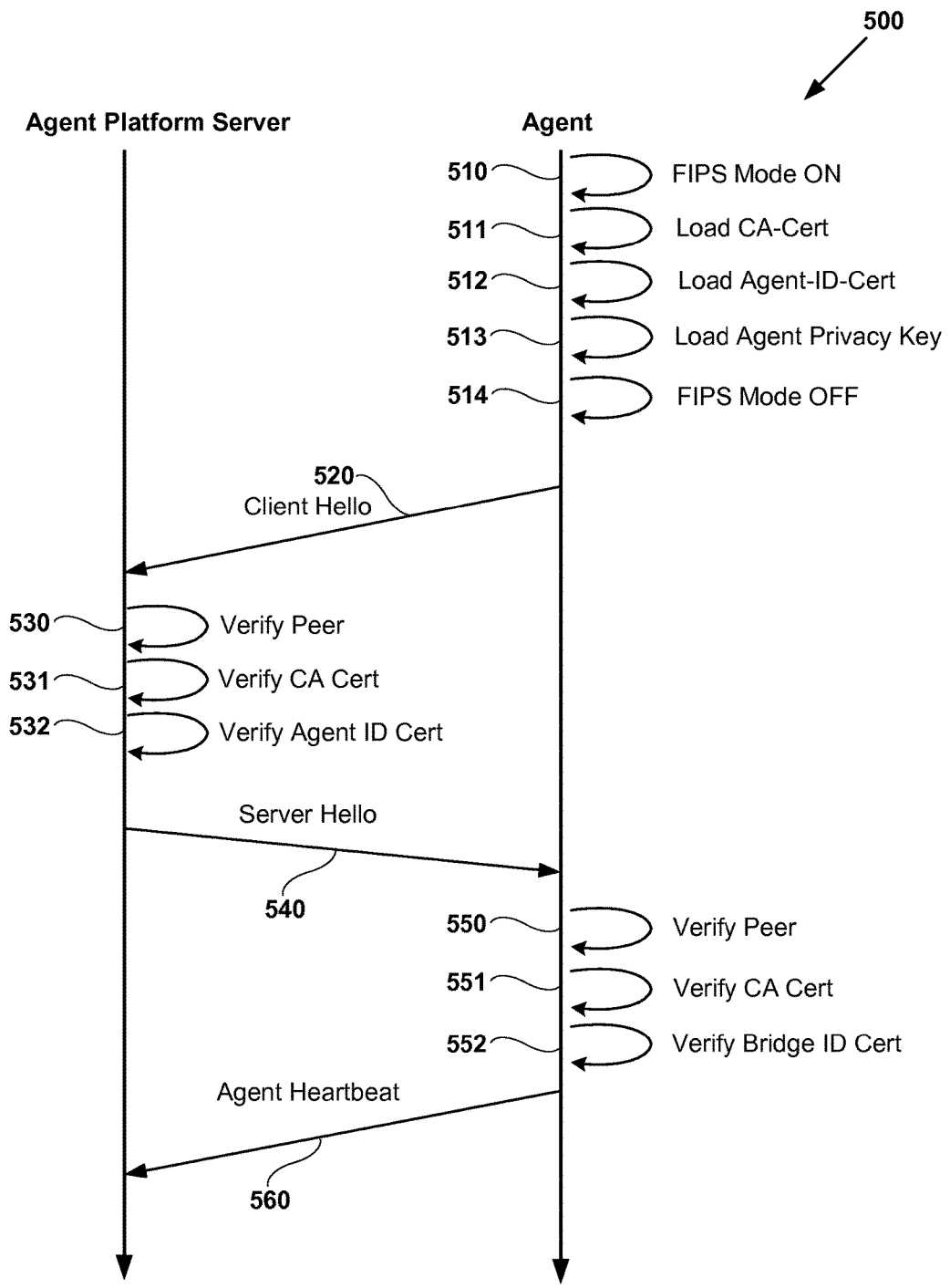
FIG. 5 is a diagram that illustrates an example handshake, as can be used in some embodiments of the disclosed technology.

FIG. 5 is a diagram 500 that outlines an example of communication between an agent and an agent platform server during agent registration, as can be used in some examples of the disclosed technology. At act 510, the agent turns FIPS mode on for use in subsequent communication. At act 511, the agent loads a certificate issued by a certificate authority. In some examples, the certificate authority is CAcert, although other certificate authorities can be used. At act 512, the agent loads an agent identification certificate. At act 513, the agent loads an agent privacy key. After loading the certificates at 511-513, the agent turns FIPS mode off at act 514 and issues a hello message to the agent platform server at act 520. The hello message includes the certificates loaded at acts 511 and 512 and is encrypted using the agent privacy key generated at act 514.

After receiving the hello message, the agent platform server verifies the agent peer information at act 530, the certificate at act 531, and the agent identification certificate at act 532. Once the information is verified at acts 530-532, the agent platform server responds to the agent with a hello message at act 540.

After the agent receives the agent platform server's hello message, it responds by verifying the server peer information at act 550, the server's certificate authority-issued certificate at act 551, and the bridge identity certificate at act 552. Once the information in the server hello message has been successfully verified, the agent responds with an agent heartbeat message 560. As further detailed above, the agent heartbeat message includes information that can be used to process spooled-off messages from plugins and to identify and request plugin services, including time data, spooler marker numbers, and available messages that are processed by the agent's plugins.

Figure 6:
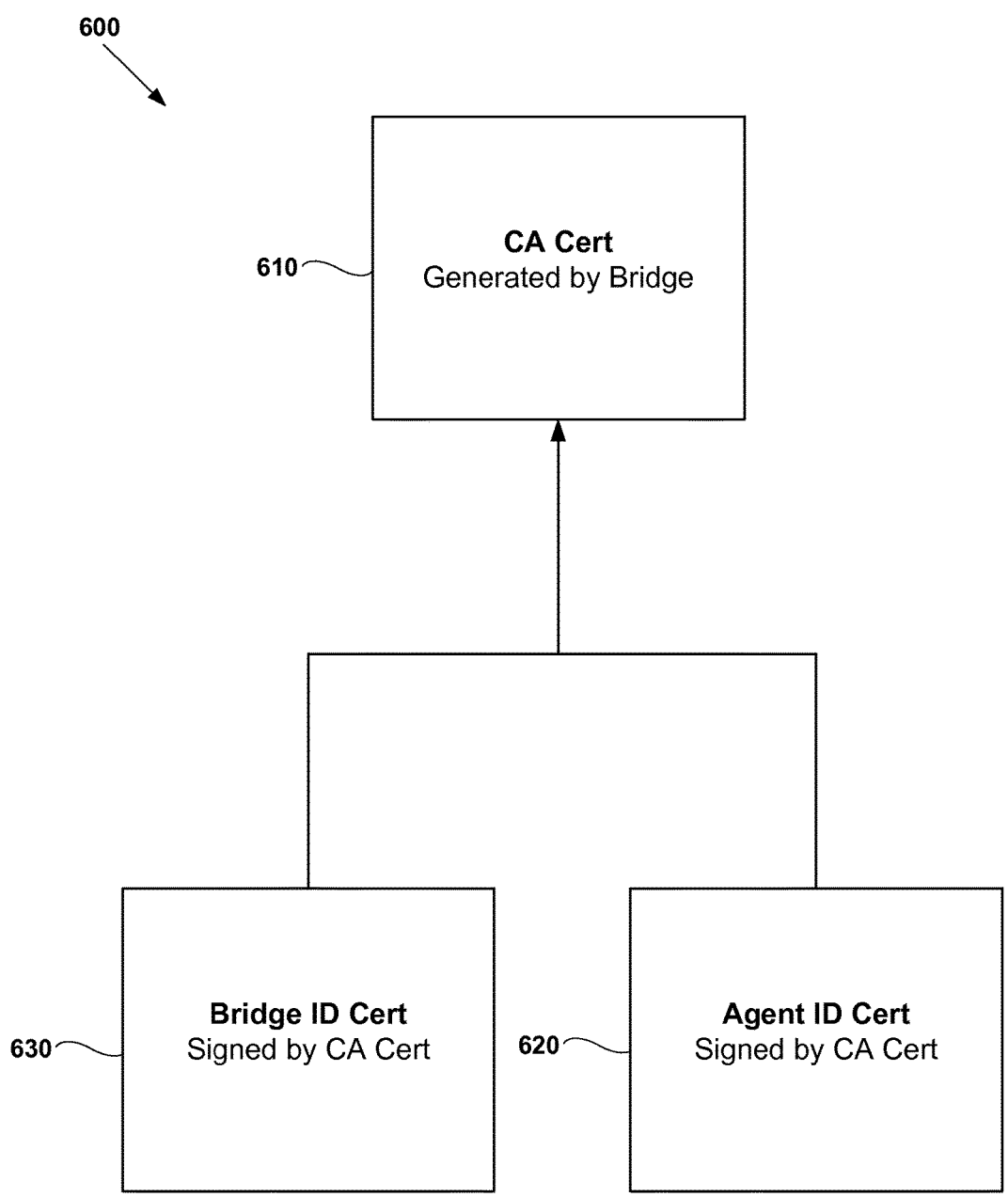
FIG. 6 is a diagram illustrating certificates that can be used in some embodiments of the disclosed technology.

FIG. 6 is a diagram 600 illustrating generation of a certificate 610 by the agent platform server based on both the agent identification certificate 620 loaded at act 512 and the bridge identification certificate 630 sent with the agent platform server hello message at act 540. The certificate 610 can be used to authenticate communications between agents and agent bridges.

D. Agent/Bridge Server Messaging Flow

Figure 7:
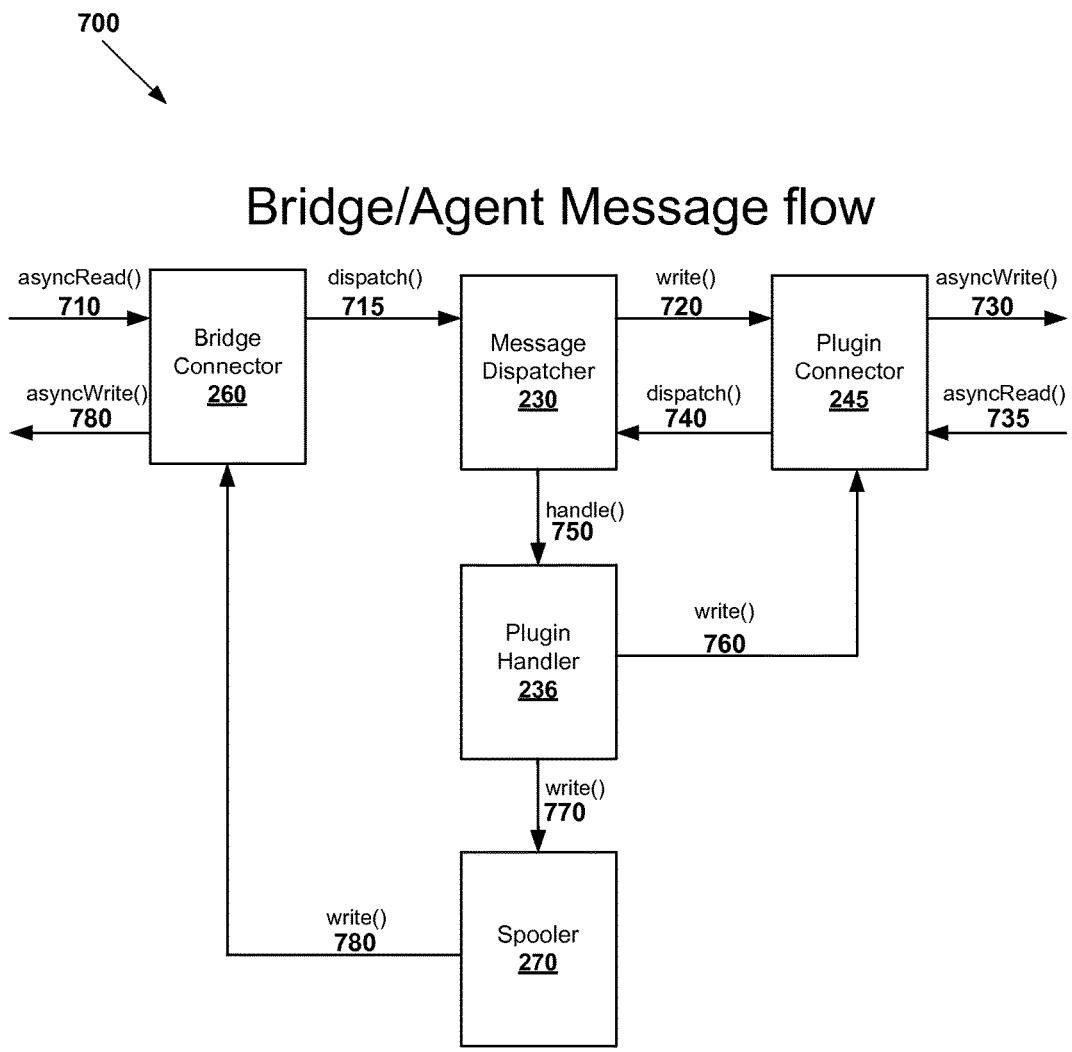
FIG. 7 is a diagram that illustrates message flow between agent and bridge components, as can be used in some embodiments of the disclosed technology.

FIG. 7 is a diagram 700 that illustrates the message flow between various agent/bridge components, as can be performed in certain examples of the disclosed technology. As shown in FIG. 7, a message from the agent bridge 160 hosted by an agent platform server 150) is asynchronously read 710 by the bridge connector 260 hosted by an agent (e.g., agent 110). The bridge connector 260 then dispatches 715 the received message to the message dispatcher 230. The message dispatcher 230 determines the appropriate plugin for servicing the message, and issues a write message 720 to the appropriate plugin's plugin connector 245. The plugin connector 245 issues an asynchronous write message 730 to the plugin, and responsive to the message, receives an asynchronous read message 735. The plugin connector 245 then sends a dispatch message 740 to the message dispatcher 230, which in turn sends a handle message 750 to the plugin handler 237. The plugin handler sends a write message 760 to the plugin connector 245 and also sends a write message 770 to the spooler 270. The data from the plugin is stored in a spool at the spooler 270 until the message can be sent to the bridge by sending a write message 780 to the bridge connector 260. Once the bridge connector 260 establishes a connection to the bridge, after the plugin services the message, its data is returned to the plugin connector with an asynchonous read. In some instances message writes and reads maybe all be synchronous, asynchronous or a combination of both.

E. First Example Agent Message Sequence

Resend Request

ResendRequest Message

As data is received from one or more agents, the agent data consumers 190 can monitor messages received from the agents (including messages from agent plugins) and request resends of any messages that are missing. In some examples, the bridge (e.g. agent bridge 160) can perform similar monitoring and request resends. Because the order in which messages are delivered to the agent data consumers (e.g., the compliance server 191) is not necessarily guaranteed, it is typically advantageous for the compliance server 191 to have handling capabilities for messages received out of order.

One high-level example of how a compliance server handles missing messages is provided below. Assume that a compliance server receives the following stream of data, and that the WelConfigResponse and WelData messages are for the same configuration serial_number.

An example of major and minor numbers used to address plugin messages are described in Table 2 below.

TABLE 2

| Message | Major Number | Minor Number |
| --- | --- | --- |
| WelConfigResponse | 5 | 1 |
| WelData | 5 | 1 |
| WelData | 5 | 2 |
| WelData | 5 | 3 ... 50 |
| WelData | 5 | 55 |
| WelData | 5 | 56 ... 101 |
| WelData | 6 | 1 |

As shown in Table 2, a number of messages have been dropped.

The first message is a WelConfigResponse message, which is received in response to a previously-sent WelConfigRequest message. The compliance server then starts receiving a number of WelData messages, which have major number 5 and minor numbers, being consecutive integers from 1 to 50. The next WelData message received by the compliance server has the same major number (5) but a minor number of 55, which indicates a gap in WelData for minor numbers 51-54.

Responsive to detecting the missing data, the server sends a ResendRequest message to the agent. An example format for the message is "ResendRequest previous(5, 50)," which indicates that the next five messages starting from minor message number 50 are being requested. The server then waits for data to be sent (e.g., in a ResendResponse message). Assuming the messages were actually dropped, then the missing 4 data messages should be received, followed by a ResendResponse message:

status_code FOUND (5, 51) (5, 54)

As will be readily understood to one of ordinary skill in the art, it should be noted that the message names and formatting are for exemplary purposes, and that other suitable formats of messages can be used in certain embodiments.

Rolled Major Numbers Messages

Continuing the exemplary datastream illustrated in Table 2, above, when server receives the WelData messages (5,101) followed by WelData (6,1), it will realize that some data from the agent may be missing. Responsive to determining a gap in the received messages, the server determines the new major sequence number in the received data stream (6) and identifies possible missed messages. The server constructs and sends a ResendRequest for the possibly missing data. The message can be formed as:

ResendRequest
previous (5, 101)
next (6,1).

Upon receipt of this ResendRequest message, the agent scan its spool and resends any messages that are identified as missing by the ResendRequest, in a similar fashion to the ResendResponse message discussed above. Conversely, if the agent determines that there are no missing messages to send in response to the ResentRequest, a message is sent to indicate this to the server:

ResendResponse
request=ResendRequest ID
status_code NOT_FOUND_MISSING
(5,102)
(6,0)

(where ResendRequest ID is the identifier for the Resend Request being responded to, and messages 5-102 through 6-0 are the missing messages not found in the spooler).

In some examples, messages that appear to be missing will occur normally, as the major number used by the agent is incremented upon starting or restarting the associated plugin.

Missing or Corrupt Messages

Using the same example of a dropped message discussed above, the agent can also send a number of different status codes, depending on the cause of the missing message(s). Table 3 below lists a number of different status codes that can be used in an exemplary embodiment of the disclosed technology:

TABLE 3

| Code | Description |
| --- | --- |
| FOUND | Message was found and resent |
| NOT_FOUND_CORRUPT | The internal or data message was corrupt in the spool and messages are/may be missing |
| NOT_FOUND_MISSING | The requested message is not in the spool (message may have never existed) |
| NOT_FOUND_TOO_OLD | The message is of a range that is before the oldest message in the spool (message may have never existed) |
| NOT_FOUND_UNKNOWN | Unknown cause of missing message(s) |

The following examples illustrate messages being sent in different scenarios responsive to a ResendRequest.

For example, if the next message received at the server is (major, minor): (5, 100), then the server would expect to receive messages (5,1) through (5,99) previously, otherwise, the messages are determined to be missing. A ResendRequest for messages between (5,1) and (5,100) is sent. If the agent returns any of the NOT_FOUND_* status codes, then the messages are determined to have been lost.

In another variation of this example, if the next message received is (6,1), then a ResendRequest is sent to determine whether any messages between (5,100) and (6,0) were not received. A ResendRequest for messages between (5, 100) and (6, 0) is sent. If the agent returns the code NOT_FOUND_CORRUPT, then the server determines that data has been lost. Alternatively, if the agent returns the code NOT_FOUND_MISSING, then the server determines that all the data between (5,100) and (6,0) has been received from the agent. Alternatively, if the agent returns the code NOT_FOUND_TOO_OLD, then the result is indeterminate—the server determines that data from the agent may or may not have been lost.

F. Second Example Agent Message Sequence

Resend Request

Figure 8:
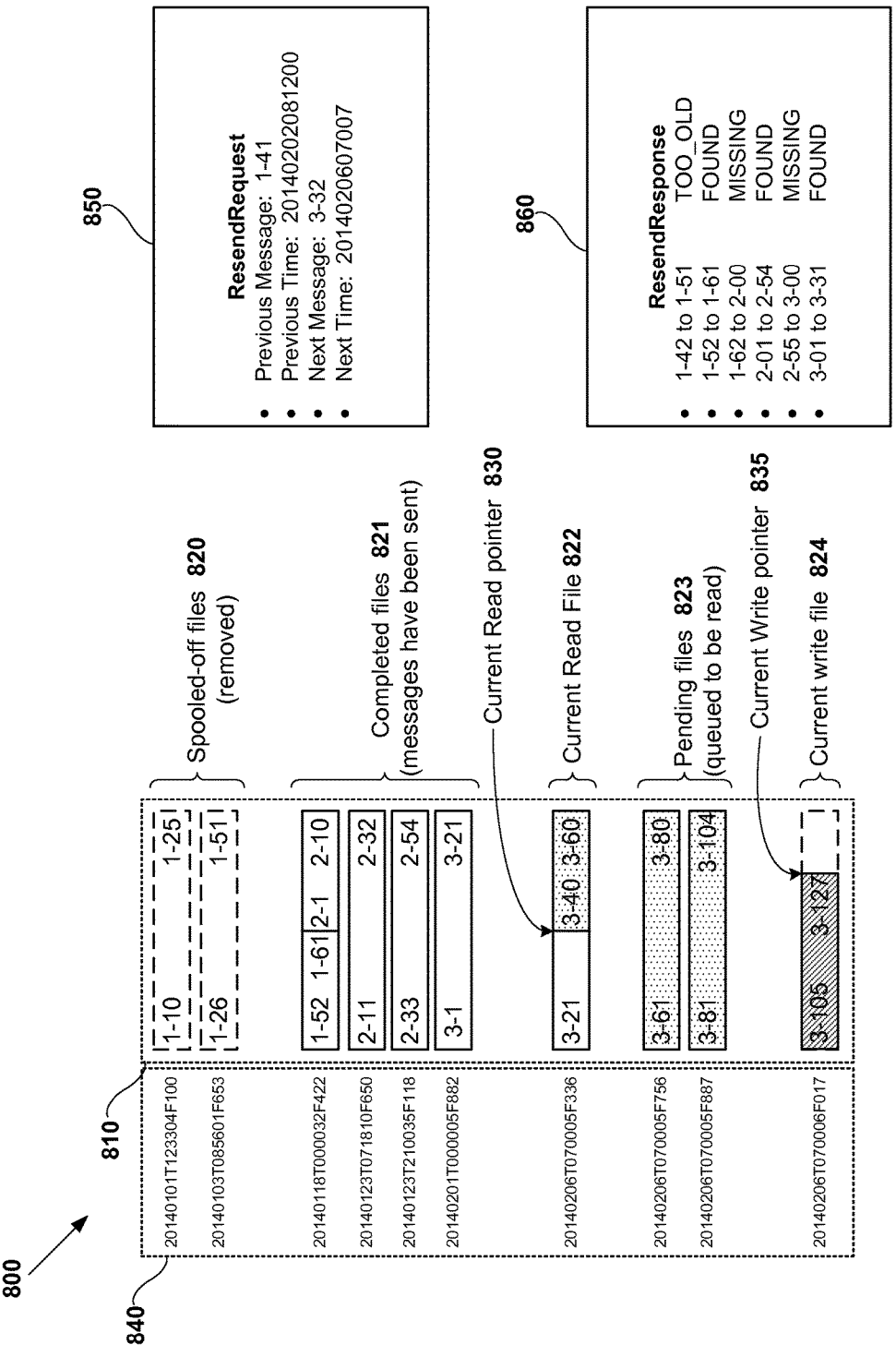
FIG. 8 is a diagram illustrating aspects of a spooler, as can be used in some embodiments of the disclosed technology.

This section discussed another example of ResendRequest handling, as can be performed in certain embodiments of the disclosed technology. Assume that a system comprising an agent, bridge, and compliance server are in the state depicted in the diagram 800 of FIG. 8. As shown in FIG. 8, a number of messages are, or have been, stored in a spool memory 810 (indicated by the files within the dashed lines), which includes a number of individual spool files (e.g., two spooled-off files 820, four completed files 821, etc.). Each rectangle depicted within the spool memory 810 represents a different spool file. The spool memory 810 can be implemented within an agent 110, as described above regarding FIGS. 1-3, although in other examples, different suitable agent architectures can be employed.

Two spooled-off files 820 have already been removed from the spool and are no longer accessible. The first spooled-off file started at message number (1-10) and ended at (1-25), while the second spooled-off file (1-26) and ended at (1-51).

Four completed spool files 821 have been sent to the agent bridge, but have not yet been removed from the spool. The message data in the completed spool files 821 is available to be re-sent to the agent bridge if requested. As shown in FIG. 8, the first completed file spans two major numbers, from (1-52 to 1-61 and 2-1 to 2-10). The major number was advanced from 1 to 2 due to, for example, restarting of the agent or restarting of a plugin associated with the spool.

The current read spool file 822 is shown, which includes messages from 3-21 to 3-60. A current read pointer 830 indicates the current read position for spool messages being sent from the agent to the agent bridge. The current read pointer 830 is advanced as additional messages from the spool are sent to the agent bridge.

Two pending files 823 are shown, which are queued to be read after the current read file 822 has been completely read and send to the agent bridge.

The current write file 824 is shown, which starts at position 3-105 and currently ends at 3-127. The current write pointer 835 stores the current position for writing within the current write file 824.

As shown in FIG. 8, each of the spool files 820-824 includes one of the time stamps 840 shown. The time stamps can be used to determine the current lag time between messages. Lag time information can be used to, for example, adjust the rate at which messages are sent to the agent bridge or the rate at which plugins produce data.

In some examples of the disclosed technology, each of the spool files 820-824 includes a header indicating the size of the spool file, an envelope, and message data. Messages used to transmit data from the agent to its agent bridge can include an envelope with data that can be used to identify the agent and/or the plugin producing the message data, for example: message type, agent UUID, destination UUID, major/minor number, and timestamp can be included in the message envelope.

As an example, assume that the system of FIG. 1 is being used to spool plugin data to the agent data consumers 190. One of the agent data consumers 190 determines that some agent data may be missing, and the agent data consumer sends the agent 110 a ResendRequest message 850. The ResendRequest message 850 includes an indication of the previous message (1-41) and next message (3-32) before and after the messages that may be missing, thereby indicating a range of messages to be searched. The ResendRequest message 850 also includes the respective time stamps (20140202081200 and 2014020607007) for the possible missing messages.

The agent receives the ResendRequest message 850 and searches the spool memory 810 (e.g., using a message searcher 372). The agent message search determines that: messages 1-42 through 1-51 are too old and have been deleted from the spool ("TOO_OLD"); messages 1-52 through 1-61, 2-01 through 2-54, and 3-01 through 3-31 were found and are still stored in the spool ("FOUND"), and messages 1-62 through 2-00 and 2-55 and 3-00 are missing ("MISSING") (because the messages were never generated). The agent sends a ResendResponse 860 indicating the results of the agent message search to one or more of the agent data consumers 190. In some examples, the agent also automatically sends the FOUND messages to the agent data consumer that sent the ResendRequest, while in other examples, the agent waits for an additional request to send particular messages from the spool.

The agent data consumers 190 that receive the ResendResponse 860 can react accordingly. For some applications, lost or missing data may merely be noted, while in other applications, the data can be used to, for example, initiate additional vulnerability scans to replace the missing data.

G. Server/Agent/Plugin Contract

In some examples of the disclosed technology, there is the shared contract for server components, agents, and their plugins. The contract can be expressed in an Interface Definition Language (IDL) and implemented using an Application Programming Interface (API) to coordinate between server components, agents, and their plugins. The contract establishes a syntax for creating properly formed messages, including defining required and optional fields in the messaging protocol.

Under the example contract, the agent is responsible for full verification of a plugin package before it is considered and is available to be launched. The plugin package includes: executable files, configuration information, and/or command line arguments including a manifest. The plugin package can be digitally signed using suitable cryptographic techniques. Agents (e.g., agents 110-112) can verify the plugin's digital signature before the plugin is considered for operation. In some examples, the plugin package is re-verified every time the plugin is started, while in other examples, the plugin package is re-verified periodically, at system startup, or other suitable intervals. Plugins can connect to the agent using only the pipes given to it from the command line arguments. Plugins use the configuration and log directories passed to it from the command line arguments. The first message an agent sends to a plugin after connect is a HandshakeRequest message. The agent includes full path information for plugin's directory and the plugin's executable directory (plugin package directory). The executable directory is used for locating shared libraries the plugin may use or delegate to another application, for example: a Real-Time Manager application (RTMGR). A RTMGR application can communicate to operating system kernel modules to obtain user-specific security information that is associated with a particular event or change or operation that a plugin is monitoring.

The first message from a plugin sent to the agent is a HandshakeResponse message after it has received a HandshakeRequest. The plugin uses the data directory given to it in the HandshakeRequest it receives from the agent. The Agent periodically sends StatusRequest messages to all plugins. Plugins respond to StatusRequest messages from the agent with StatusResponse messages.

Plugins are expected to respond immediately to a Shutdown request message. The plugin periodically persists its last working position if the plugin cannot immediately persist when it receives a Shutdown message from the agent.

Upon restart, plugins resume work from the state using its last ConfigRequest. The plugin manages any incomplete units of work.

If a plugin has no work to do and it is designed for on-demand loading, it informs the agent by sending a PluginExiting message. The agent subsequently moves the plugins capabilities to the on-demand maps and sends a Shutdown message to the Plugin and removes the plugin from the plugin list. The agent is responsible to re-launch the plugin if a message is received that is contained in the message catalog. Servers, agent and plugins operate to keep the amount of message data in the spooler at or below a selected limit (e.g., to avoid using more than 80% of the spooler capacity). In some examples, the selected limit for the current capacity can be adjusted. Agent and plugin messages can be formed and enveloped as Protobuf messages. Thus, the agent does not need to have detailed information about the plugin's structure or operation.

H. Agent Authentication

In some examples of the disclosed technology, the bridge is configured to use a registration key for authentication. When in this registration mode, the agent must supply the correct registration key to the bridge upon first connecting to the bridge in order to authenticate to the bridge. The initial key can be sent using anonymous SSL. After successfully authenticating the key, the agent subsequently receives an encryption certificate (e.g., a public-key certificate such as an X.509 certificate) that can be used for encrypting messages sent using subsequent connections to the bridge. If the registration key is changed (e.g., by system administrator re-configuring the bridge) the agent can continue to use the certificate that was received early using the older key. However, any new agent instances will need to use the new registration key to acquire their corresponding certificates.

VII. Exemplary Method of Spooling of Host Data

Figure 9:
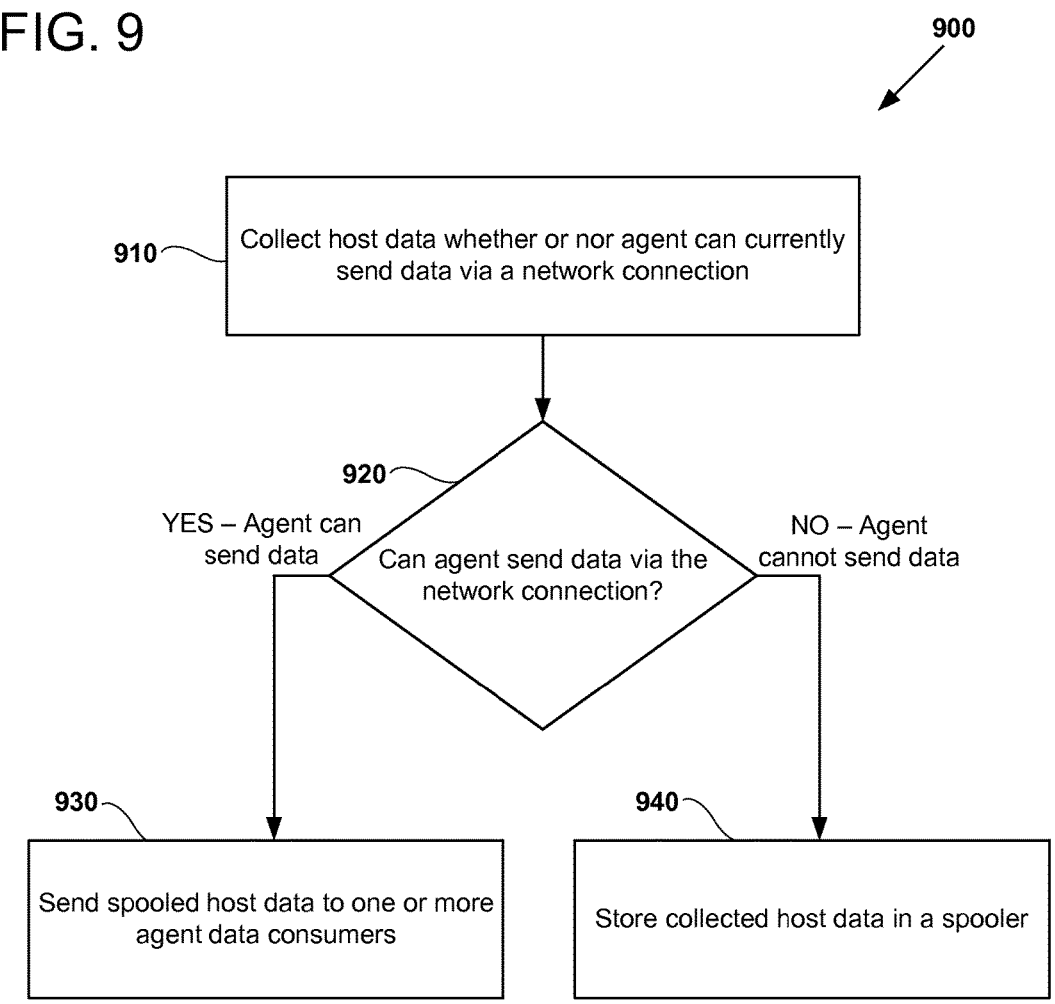
FIG. 9 is a flow chart illustrating an example method of spooling host data, as can be performed in some examples of the disclosed technology.

FIG. 9 is a flow chart 900 illustrating an example method of spooling host data, as can be performed in some examples of the disclosed technology. For example, an agent hosting an agent spooler 270 in the computing environment 100 discussed above can be employed to perform the illustrated method.

At process block 910, an agent operating on a computing host having one or more network connections collects host data from, e.g., one or more plugins on the computing host. The agent is configured to collect the host data whether or not the agent can currently send data via any of the network connections. The types of data collected using the plugins can include FIM data, COCR data, WEL data, Windows Registry data, or other suitable data. After collecting the data, the method proceeds to process block 920.

At process block 920, the agent determines whether it can send data via the host computer's network connection(s), and if so, the method proceeds to process block 930. If not, the method proceeds to process block 940.

At process block 930, the agent has determined that it can send data via the network, and the agent proceeds to send at least a portion of the spooled host data to at least one of agent data consumers. For example, data can be sent to any of the agent data consumers 190 illustrated in FIG. 1 via an agent bridge 160. In some examples, the collected data is temporarily stored in the spooler before being sent.

At process block 940, the agent stores at least a portion of the collected host data in a spooler for later transmission. In some examples, the spooler 270 discussed above can be employed. In some examples, some of the spooled data can be overwritten or removed based on the priority of the data, or according to other suitable criteria.

After the collected host data is sent (according to process block 930) or stored (according to process block 940), the method can proceed to collect more host data. As the computer network connection becomes available or unavailable, the agent can elect to store data in the spooler or send data accordingly. The rate at which the spooled data is sent can be increased or decreased based on, for example, the lag of the spooler or host computer resources. In some examples, the data that is collected is based on a request for a type of data. The agent searches for plugins that can provide the requested type of data, and invokes a corresponding plugin if found. In some examples, agent can send a description of the types of data and/or messages that can be produced by the agent.

Figure 10:
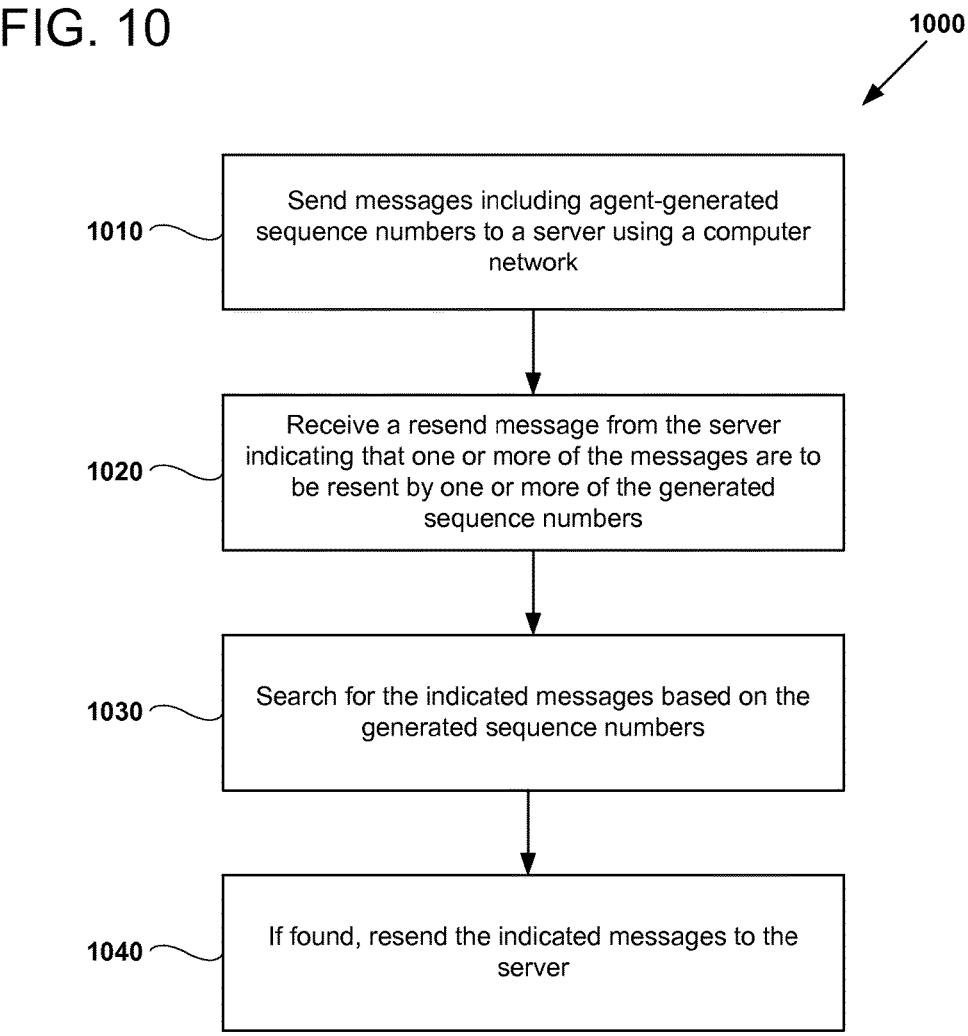
FIG. 10 is a flow chart illustrating an example method of resending messages based on agent-generated sequence numbers, as can be performed in some examples of the disclosed technology.

VIII. Exemplary Method of Sending Messages with Agent-Generated Sequence Numbers FIG. 10 is a flow chart 1000 illustrating an example method of resending messages based on agent-generated sequence numbers, as can be performed in some examples of the disclosed technology. For example, a computer hosting an agent 110 operating in the computing environment 100 discussed above can be employed to perform the illustrated method.

At process block 1010, an agent executing on a host computer, sending one or more data messages to a server with the computer network. The data messages including sequence numbers generated by the agent. For example, each of the sequence numbers can include a major number, which is incremented upon starting or restarting the agent, and a minor number, which is incremented with each message sent. Further examples of suitable sequence numbers as can be used in some examples of the disclosed technology are discussed above and illustrated in FIG. 8.

At process block 1020, the agent receives a resend message from the server indicating that one or more of the data messages are to be resent. The messages to be resent are indicated using at least some of the sequence numbers, for example, a range of sequence numbers can be used. The ResendRequest message 850 illustrated in FIG. 8 is an example of suitable resend message. After receiving the resend message, the method proceeds to process block 1030.

At process block 1030, the agent searches for the indicated messages based on the one or more of the generated sequence numbers. In some examples, the messages may have already been removed from the agent's host computer. After searching for the messages, the method proceeds to process block 1040.

At process block 1040, the agent can resend one or more of the requested messages and resend any messages still stored on the agent's host computer. In some examples, an additional reply message, such as the ResendRespond message 860 illustrated in 860, can be sent with the resent data messages to describe which of the requested messages have been found, are too old, or are missing.

IX. Exemplary Method of Identifying Agent Messages

Figure 11:
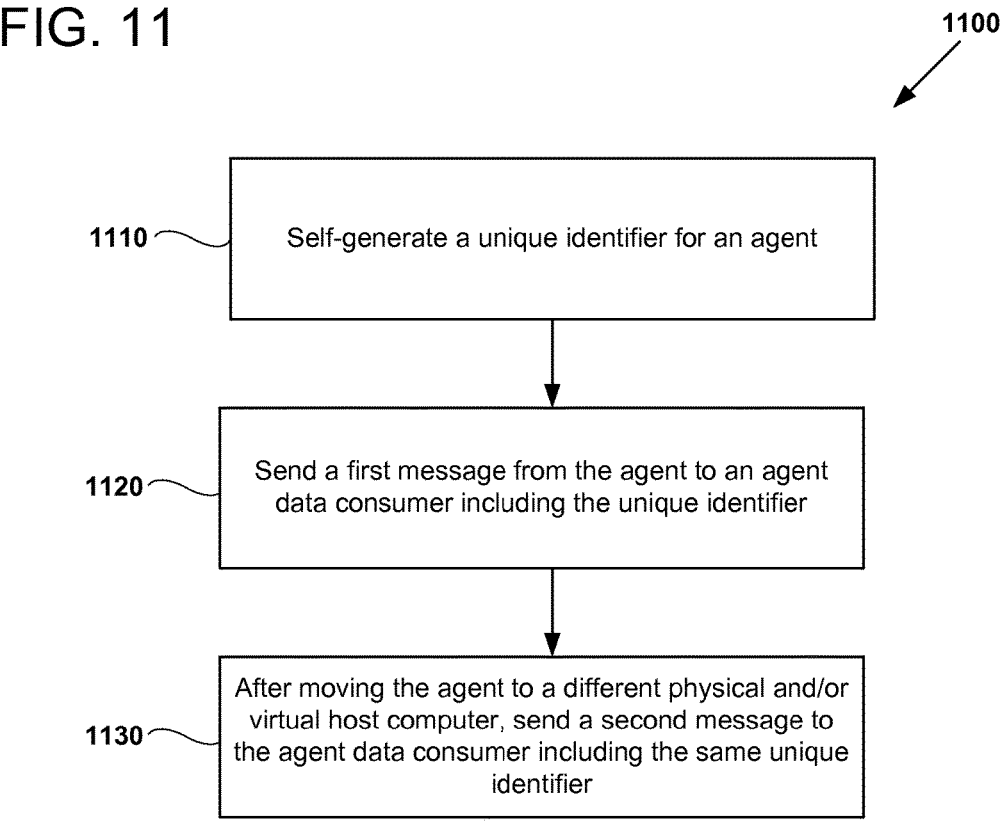
FIG. 11 is a flow chart illustrating an example method of using a unique identifier for sending agent messages, as can be performed in some examples of the disclosed technology.

FIG. 11 is a flow chart 1100 illustrating an example method of identifying agent messages sent on a computer network, as can be performed in some examples of the disclosed technology. For example, a computer hosting an agent 110 operating in the computing environment 100 discussed above can be employed to perform the illustrated method.

At process block 1110, the agent 110 self-generates a unique agent identifier for itself. The agent identifier is independent of any network addresses associated with the agent's host computer. The agent identifier can be, for example, a UUID. After generated the agent identifier, the method proceeds to process block 1120.

At process block 1120, the agent sends a first message to at least one agent data consumer (e.g., one or more of the agent data consumers 190). The agent data consumer can stored the agent identifier for use in determining the origin of subsequent messages from the agent. After sending the first message, the method proceeds to process block 1130.

At process block 1130, the agent is moved to a different physical and/or virtual host computer. The agent then sends a second message to the agent data consumer including the same agent identifier. By using the same identifier, the agent data consumer can track messages from the same agent even though the agent is operating from a different network address.

In some examples, of the exemplary method, the agent can be replicated (e.g., on one or more additional physical and/or virtual hosts), and each of the replicated agents in turn self-generates a unique agent identifier for itself, thereby allowing agent data consumers to distinguish amongst the replicated agents and the original agent. Further, the same agent identifier can be used in scenarios where, e.g., the agent's network address changes when a network interface card is changed, but without changing the agent identifier.

X. Exemplary Computing Environment

Figure 12:
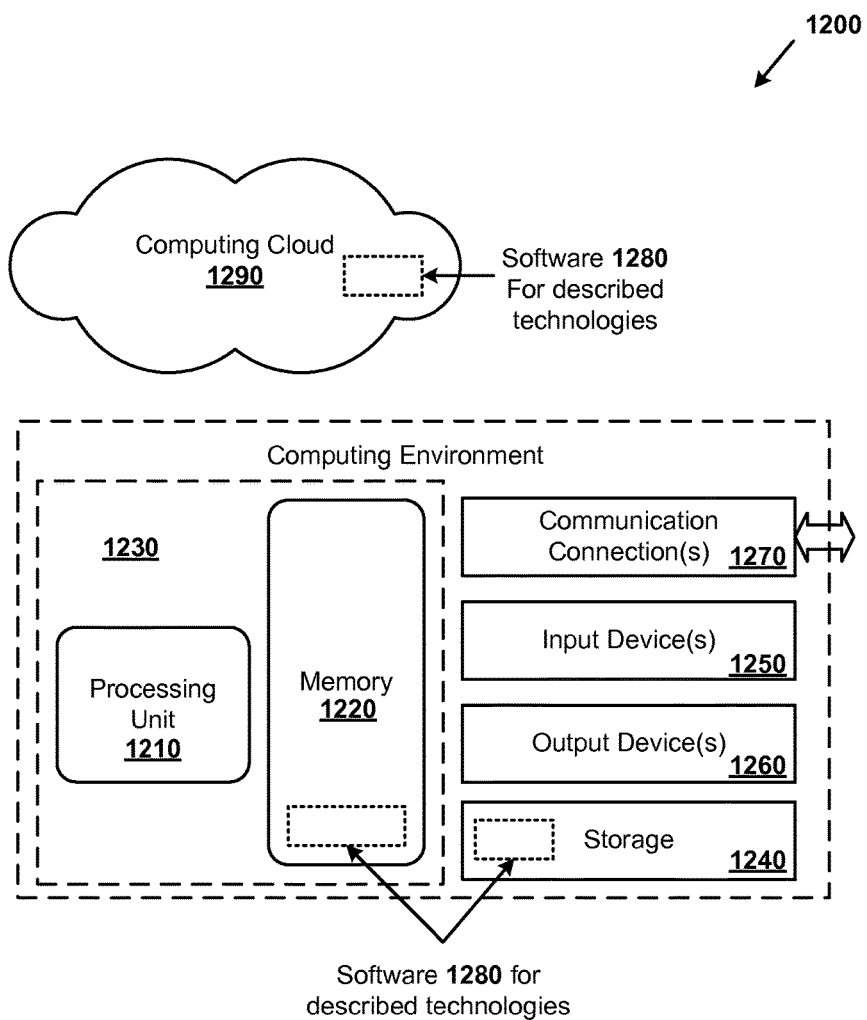
FIG. 12 is a block diagram illustrating a suitable computing environment for implemented some embodiments of the disclosed technology.

FIG. 12 illustrates a generalized example of a suitable computing environment 1200 in which described embodiments, techniques, and technologies, including reporting agents and monitor servers, can be implemented. For example, the computing environment 1200 can implement agents, agent platform servers, and agent data consumers, as described herein.

The computing environment 1200 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 12, the computing environment 1200 includes at least one central processing unit 1210 and memory 1220. In FIG. 12, this most basic configuration 1230 is included within a dashed line. The central processing unit 1210 executes computer-executable instructions and may be a real or a virtual processor. In a multi-processing system, multiple processing units execute computer-executable instructions to increase processing power and as such, multiple processors can be running simultaneously. The memory 1220 may be volatile memory (e.g., registers, cache, RAM), non-volatile memory (e.g., ROM, EEPROM, flash memory, etc.), or some combination of the two. The memory 1220 stores software 1280, images, and video that can, for example, implement the technologies described herein. A computing environment may have additional features. For example, the computing environment 1200 includes storage 1240, one or more input devices 1250, one or more output devices 1260, and one or more communication connections 1270. An interconnection mechanism (not shown) such as a bus, a controller, or a network, interconnects the components of the computing environment 1200. Typically, operating system software (not shown) provides an operating environment for other software executing in the computing environment 1200, and coordinates activities of the components of the computing environment 1200.

The storage 1240 may be removable or non-removable, and includes magnetic disks, magnetic tapes or cassettes, CD-ROMs, CD-RWs, DVDs, or any other medium which can be used to store information and that can be accessed within the computing environment 1200. The storage 1240 stores instructions for the software 1280, plugin data, and messages, which can be used to implement technologies described herein.

The input device(s) 1250 may be a touch input device, such as a keyboard, keypad, mouse, touch screen display, pen, or trackball, a voice input device, a scanning device, or another device, that provides input to the computing environment 1200. For audio, the input device(s) 1250 may be a sound card or similar device that accepts audio input in analog or digital form, or a CD-ROM reader that provides audio samples to the computing environment 1200. The output device(s) 1260 may be a display, printer, speaker, CD-writer, or another device that provides output from the computing environment 1200.

The communication connection(s) 1270 enable communication over a communication medium (e.g., a connecting network) to another computing entity. The communication medium conveys information such as computer-executable instructions, compressed graphics information, video, or other data in a modulated data signal. The communication connection(s) 1270 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed agents, bridges, and agent data consumers. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1290. For example, agents can be executing vulnerability scanning functions in the computing environment 1230 while agent platform (e.g., bridge) and agent data consumer service can be performed on servers located in the computing cloud 1290.

Computer-readable media are any available media that can be accessed within a computing environment 1200. By way of example, and not limitation, with the computing environment 1200, computer-readable media include memory 1220 and/or storage 1240. As should be readily understood, the term computer-readable storage media includes the media for data storage such as memory 1220 and storage 1240, and not transmission media such as modulated data signals.

In view of the many possible embodiments to which the principles of the disclosed invention may be applied, it should be recognized that the illustrated embodiments are only preferred examples of the invention and should not be taken as limiting the scope of the invention.

We claim:

1. A method of collecting data from an agent executing on a host computer, the host computer being connected to one or more agent data consumers via a network connection, the method comprising:
   with the agent, searching for one or more software plugins among a plurality of plugins available on the host computer;
   with the agent, loading at least one of the one or more software plugins for execution on the host computer by the agent;
   with the agent, receiving a request for host data from an agent bridge via the network connection;
   based at least in part on the request, selecting at least one of the loaded software plugins to collect the requested host data and invoking the selected plugin on the host computer;
   collecting the host data with the agent using the selected software plugin on the host computer, the collecting occurring whether or not the agent can currently send data via the network connection;
   when the agent cannot send data via the network connection, storing at least a portion of the collected host data in a spooler hosted by the agent; and
   when the agent can send data via the network connection, sending at least a portion of the spooled host data to at least one of the agent data consumers.

2. The method of claim 1, wherein a rate at which spooled data is sent to the agent data consumers is increased or decreased based at least in part on lag of the spooler.

3. The method of claim 1, wherein a rate at which data is spooled and/or a rate at which the spooled data is sent to the one or more agent data consumers is based at least in part on currently-available resources of the host computer.

4. The method of claim 1, wherein:
   one or more plugins executable on the host computer collect the host data;
   the agent sends data to the plugins indicating lag of the spooler; and
   the plugins adjust a rate of collecting host data based at least in part on the indicated spooler lag.

5. The method of claim 1, wherein:
   the host data is collected by one or more plugins executable on the host computer when the agent cannot send data via the network connection; and
   wherein the spooled host data is sent to the at least one of the agent data consumers via a bridge executing on an agent platform server.

6. The method of claim 1, wherein a point in time at which the spooled host data is sent to the at least one of the agent data consumers is based at least in part on a pseudorandom or random number.

7. The method of claim 1, further comprising sending a shutdown message to one or more plugins executing on the host computer based on currently-available data capacity of the spooler.

8. The method of claim 1, wherein:
   the spooler comprises a first-in-first-out (FIFO) queue and a last-in-first-out queue (LIFO); and
   at least a portion of data in the LIFO queue is sent before data in the FIFO queue, the sent LIFO queue data being generated at a later point in time than at least a portion of the FIFO queue data.

9. The method of claim 1, wherein the agent data consumers are first agent data consumers, and wherein the method further comprises, after the collecting, the spooling, and the sending:
   sending at least a portion of the spooled host data to a second one or more agent data consumers, wherein the second agent data consumers are different than the first data agent consumers.

10. The method of claim 1, wherein each of the plugins is associated with a different set of one or more spool files controlled by the spooler.

11. The method of claim 1, further comprising:
   receiving a request from the agent bridge for a description of data that can be generated by the plugins; and
   responsive to receiving the request, sending a description of messages that can be produced by the agent from one or more of the plugins to the agent bridge, wherein the plugins associated with the described messages is identified in the description.

12. One or more non-transitory computer-readable storage media storing computer-readable instructions that when executed by a host computer, cause the host computer to perform a method of collecting data from an agent executing on the host computer, the computer being connected to one or more agent data consumers via a network connection, the method comprising:
   with the agent, searching for one or more plugins software plugins among a plurality of available on the host computer;
   with the agent, loading at least one of the one or more software plugins for execution on the host computer by the agent;
   with the agent, receiving a request for host data from an agent bridge via the network connection;
   based at least in part on receiving the request, invoking one or more of the loaded plugins on the host computer;

collecting host data with the invoked agents using the plugins executing on the host computer, the collecting occurring whether or not the invoked agents can currently send data via the network connection;

if the invoked agents cannot send currently data via the network connection, storing at least a portion of the collected host data in a spooler hosted by the invoked agent; and if the invoked agents can currently send data via the network connection, sending at least a portion of the spooled host data to at least one of the agent data consumers via the network connection.

13. The computer-readable storage media of claim 12, wherein a rate at which spooled data is sent to the agent data consumers is increased or decreased based at least in part on lag of the spooler.

14. The computer-readable storage media of claim 12, wherein a rate at which data is spooled and/or a rate at which the spooled data is sent to the one or more agent data consumers is based at least in part on currently-available resources of the host computer.

15. The computer-readable storage media of claim 12, wherein:
one or more plugins executable on the host computer collect the host data;
the agent sends data to the plugins indicating lag of the spooler; and
the plugins adjust a rate of collecting host data based at least in part on the indicated spooler lag.

16. The computer-readable storage media of claim 12, wherein:
the host data is collected by one or more plugins executable on the host computer when the agent cannot send data via the network connection; and
wherein the spooled host data is sent to the at least one of the agent data consumers via a bridge executing on an agent platform server.

17. The computer-readable storage media of claim 12, wherein a point in time at which the spooled host data is sent to the at least one of the agent data consumers is based at least in part on a pseudorandom or random number.

18. The computer-readable storage media of claim 12, wherein the method further comprises sending a shutdown message to one or more plugins executing on the host computer based on currently-available data capacity of the spooler.

19. The computer-readable storage media of claim 12, wherein:
the spooler comprises a first-in-first-out (FIFO) queue and a last-in-first-out queue (LIFO); and
at least a portion of data in the LIFO queue is sent before data in the FIFO queue, the sent LIFO queue data being generated at a later point in time than at least a portion of the FIFO queue data.

20. The computer-readable storage media of claim 12, wherein the agent data consumers are first agent data consumers, and wherein the method further comprises, after the collecting, the spooling, and the sending:
sending at least a portion of the spooled host data to a second one or more agent data consumers, wherein the second agent data consumers are different than the first data agent consumers.

21. The computer-readable storage media of claim 12, wherein each of the plugins is associated with a different set of one or more spool files controlled by the spooler.

22. The computer-readable storage media of claim 12, wherein the method further comprises:
receiving a request from the agent bridge for a description of data that can be generated by the plugins; and
responsive to receiving the request, sending a description of messages that can be produced by the agent from one or more of the plugins to the agent bridge, wherein the plugins associated with the described messages is identified in the description.

23. A system, comprising:
a first computer system hosting one or more agent data consumers, the first computer system comprising one or more processors and memory;
a second computer system hosting one or more agent platform servers, each of the agent platform servers including an agent bridge, the second computer system comprising one or more processors and memory; and
a network connection coupling one or more agents to a respective at least one of the agent data consumers via at least one of the agent platform servers, the agents being configured to execute on respective computing hosts, each of the computing hosts including one or more computer-readable storage media storing computer-readable instructions that when executed, cause the respective agent's computing host to perform a method, the method comprising:
searching for one or more software plugins among a plurality of plugins available on the computer;
with the agent, loading at least one of the one or more software plugins for execution on the agent's respective host computer by the agent;
receiving a request for host data from an agent bridge via the network connection;
based at least in part on the request, selecting at least one of the loaded plugins to collect the requested host data and invoking the selected plugin on the host computer;
collecting host data, the collecting occurring whether or not the at least one agent can currently send data via the network connection;
when the at least one agent cannot send data via the network connection, storing at least a portion of the collected host data in a spooler hosted by the at least one agent; and
when the at least one agent can send data via the network connection, sending at least a portion of the spooled host data to at least one of the agent data consumers via at least one of the agent platform servers.

24. The system of claim 23, wherein:
the agents include plugin means for collecting the host data and spooler means for storing data from plugin means; and
the agent platform servers include agent bridge means for sending messages between the agent data consumers and the agents.

25. The system of claim 23, wherein:
the host data is collected by one or more plugins executable on the host computer when the agent cannot send data via the network connection; and
wherein the spooled host data is sent to the at least one of the agent data consumers via a bridge executing on a computer server hosting an agent platform server.

26. The system of claim 23, wherein a point in time at which the spooled host data is sent to the at least one of the agent data consumers is based at least in part on a pseudo-random or random number.

27. The system of claim 23, further comprising sending a shutdown message to one or more plugins executing on the host computer based on currently-available data capacity of the spooler.

28. The system of claim 23, wherein the agent data consumers are first agent data consumers, and wherein the method further comprises, after the collecting, the spooling, and the sending:

sending at least a portion of the spooled host data to a second one or more agent data consumers, wherein the second agent data consumers are different than the first data agent consumers.

29. The system of claim 23, wherein the method further comprises:

receiving a request from the agent bridge for a description of data that can be generated by the plugins; and responsive to receiving the request, sending a description of messages that can be produced by the agent from one or more of plugins to the agent bridge, wherein the plugins associated with the described messages is identified in the description.

\* \* \* \* \*